United States Patent
Schwartzkopf

(10) Patent No.: US 7,270,755 B2
(45) Date of Patent: Sep. 18, 2007

(54) LIQUID FILTRATION METHOD EMBODYING SUPERBUOYANT FILTRATION PARTICLES

(76) Inventor: Steven H. Schwartzkopf, 19825 Kane Ct., Saratoga, CA (US) 95070

(*) Notice: Subject to any disclaimer, the term of this patent is extended or adjusted under 35 U.S.C. 154(b) by 0 days.

(21) Appl. No.: 11/044,592

(22) Filed: Jan. 28, 2005

(65) Prior Publication Data
US 2005/0127011 A1      Jun. 16, 2005

Related U.S. Application Data

(62) Division of application No. 10/634,595, filed on Aug. 4, 2003.

(51) Int. Cl.
    *B01D 24/36*  (2006.01)
(52) U.S. Cl. .............. 210/741; 210/717; 210/739; 210/744; 210/748; 210/793
(58) Field of Classification Search .......... 210/739, 210/741, 744, 748, 760, 793, 794, 798, 108, 210/110, 109, 120, 143, 193, 203, 253, 275, 210/277, 283, 192
    See application file for complete search history.

(56) References Cited

U.S. PATENT DOCUMENTS

| | | | |
|---|---|---|---|
| 3,067,358 A | 12/1962 | De Maine | |
| 3,469,057 A | 9/1969 | Maines | |
| 3,678,240 A | 7/1972 | Dietrick | |
| 3,709,362 A | 1/1973 | Lindstol | |
| 3,962,557 A | 6/1976 | Buck | |
| 4,032,300 A | 6/1977 | Parker et al. | |
| 4,198,301 A | 4/1980 | Iwatani | |
| 4,211,656 A * | 7/1980 | Cochrane | 210/149 |
| 4,383,920 A | 5/1983 | Muller et al. | |
| 4,387,286 A | 6/1983 | Inoue | |
| 4,415,454 A | 11/1983 | Fuchs | |
| 4,417,962 A | 11/1983 | Inoue | |
| 4,608,181 A | 8/1986 | Hsiung et al. | |
| 4,743,382 A | 5/1988 | Williamson et al. | |
| 4,747,945 A * | 5/1988 | Kreusch et al. | 210/290 |
| 4,839,488 A | 6/1989 | Katoh et al. | |
| 4,865,734 A | 9/1989 | Schulz | |
| 4,883,083 A | 11/1989 | Fisher et al. | |

(Continued)

*Primary Examiner*—Peter A. Hruskoci
(74) *Attorney, Agent, or Firm*—Jones, Tullar & Cooper, P.C.

(57) ABSTRACT

Presented is a liquid filtering apparatus and method that overcomes the disadvantages encountered with prior bed filtration systems by providing a filtering apparatus that incorporates a super-buoyant filter medium having a specific gravity very substantially lower than that of the process liquid being filtered. This feature enables a majority of the medium to float on top of the process liquid. Due to the significant differences in specific gravity between the media and the process liquid, super-buoyant media produce a highly advantageous means of naturally, gravimetrically separating both clean and contaminated filter media and process liquid into separate "phases". Under normal filtering operation, the filter media is contained within a filter housing by a bed support near the top of the filter housing, and particulate material is filtered from a process liquid that passes through the housing. To regenerate the filter media, the housing is drained and a nozzle creates a backwash spray that washes the particulate material from the filter media. During the backwash process, the filter media rises past the nozzle as the level of the backwash liquid in the housing rises, so that the entire filter media is regenerated.

22 Claims, 10 Drawing Sheets

U.S. PATENT DOCUMENTS

| | | |
|---|---|---|
| 4,885,083 A * | 12/1989 | Banks .................. 210/108 |
| 4,952,767 A | 8/1990 | Uemoto et al. |
| 4,963,257 A | 10/1990 | Schulz |
| 5,030,353 A | 7/1991 | Stuth |
| 5,122,287 A | 6/1992 | Hsiung |
| 5,126,042 A | 6/1992 | Malone |
| 5,178,772 A | 1/1993 | Daley et al. |
| 5,217,607 A | 6/1993 | Dalton, III et al. |
| 5,227,051 A | 7/1993 | Oshima |
| 5,232,586 A | 8/1993 | Malone |
| 5,386,094 A | 1/1995 | Kawai et al. |
| 5,434,381 A | 7/1995 | Mitcheson |
| 5,573,663 A | 11/1996 | Junius et al. |
| 5,618,431 A * | 4/1997 | Kondo et al. ............ 210/618 |
| 5,747,311 A | 5/1998 | Jewell |
| 5,770,080 A | 6/1998 | Malone |
| 5,833,867 A | 11/1998 | Hensley |
| 5,932,092 A | 8/1999 | Hawk et al. |
| 5,945,005 A | 8/1999 | Junius et al. |
| 6,015,497 A | 1/2000 | Steen, Jr. |
| 6,027,653 A * | 2/2000 | Holland ................. 210/690 |
| 6,638,422 B1 * | 10/2003 | Schwartzkopf ......... 210/108 |

* cited by examiner

LIQUID FILTRATION METHOD EMBODYING SUPERBUOYANT FILTRATION PARTICLES

CROSS REFERENCE TO RELATED APPLICATIONS

The invention described and claimed herein is related to application Ser. No. 09/433,910 filed Nov. 3, 1999, now U.S. Pat. No. 6,638,422, by the inventor herein.

This application is a divisional application claiming the benefit of co-pending application Ser. No. 10/634,595 filed Aug. 4, 2003, the contents of which are incorporated herein by reference.

BACKGROUND OF THE INVENTION

1. Field of the Invention

The present invention relates to an apparatus and method for filtering particulates of various sizes from miscellaneous process liquids, and more particularly to an apparatus and method that utilizes a filtration bed formed from superbuoyant media, which has a specific gravity much lower than that of the liquid being filtered.

2. Description of the Prior Art

A preliminary patentability and novelty search regarding the invention described herein has revealed the existence of the following U.S. Pat. Nos.:

| | | |
|---|---|---|
| 3,067,358 | 3,469,057 | 3,678,240 |
| 3,709,362 | 3,962,557 | 4,032,300 |
| 4,198,301 | 4,383,920 | 4,387,286 |
| 4,415,454 | 4,417,962 | 4,608,181 |
| 4,743,382 | 4,839,488 | 4,865,734 |
| 4,883,083 | 4,952,767 | 4,963,257 |
| 5,030,353 | 5,122,287 | 5,126,042 |
| 5,178,772 | 5,217,607 | 5,227,051 |
| 5,232,586 | 5,573,663 | 5,747,311 |
| 5,770,080 | 5,833,867 | 5,932,092 |
| 5,945,005 | 6,015,497 | |

A careful review of the patents noted above has failed to reveal the concept, apparatus and method disclosed herein.

The need to remove particulates, whether contaminants or products, from process liquids is common to a wide range of processes. In the following description, the focus will be on the removal of particulate contaminants from water-based process liquids, such as swimming pools, aquariums, or sewage treatment effluents, from the deionized water used during electrical discharge machining (EDM), or from aqueous solutions such as the coolants used during conventional machining. However, the same filtration mechanism can be applied to the removal of contaminants from a variety of other process liquids including paints, oils, and hydraulic liquids. The mechanism can also be applied to the filtration and harvesting of particulate materials that form the product(s) of a process and are suspended in a process liquid.

Although a variety of methods have been developed to remove particulates from such process liquids, the most popular method is media filtration. In media filtration, particulate contaminants are strained from the process liquid in one of two ways, either by pumping the contaminated liquid through a unitary permeable element, or by pumping the liquid through a filter bed that is itself composed of small particles.

In permeable element filtration, the liquid is pumped through an element which has pores or channels that allow the liquid to pass through the element but prevent the passage of particulates larger than the pore/channel diameter. Permeable elements comprise a variety of materials, including fabric, paper, ceramic, metal, and plastic. These elements filter the liquid primarily by capturing the contaminant particles on the surface of the element, thus building up a crust or layer of contaminants on the surface. As contaminants accumulate on the surface of the element, liquid flow through the permeable element is reduced because the crust or layer of contaminants acts as an obstruction and because an increasing number of the pores or channels become blocked. As the percentage of blocked pores/channels increases and the crust or layer of contaminants becomes thicker, the pressure required to maintain a specific rate of flow of liquid through the element increases. Eventually, the pressure required exceeds the capability of the pump, or some other system component, and the contaminated element must be replaced with a new element in order to maintain the desired performance of the filtration system.

Alternatively, an attempt may be made to clean the filter element (e.g., by backwashing it with clean liquid or air) to remove the contaminants accumulated on the surface. However, even when the contaminant accumulation on the surface of such an element is removed, there are usually contaminant particles that remain lodged in the permeable element that cleaning is not totally successful in removing. Ultimately, the element must either be replaced with a new element or cleaned in a more rigorous fashion, i.e. by immersion in an acid or base solution to dissolve the contaminants. The more frequently such element replacement or stringent cleaning must be performed, the more costly this filtration process becomes.

In contrast, the second type of media filtration, namely bed filtration, uses a filter bed composed of small particles such as sand or diatomaceous earth, and is one of the most common conventional methods of removing particulate contaminants from liquids. The sand filter uses sand particles that are about 0.35 mm in diameter and fairly uniform in size. Diatomaceous earth filters use a siliceous material formed from the skeletons of small (about 100 microns in diameter) marine algal cells called diatoms. Both sand and diatomaceous earth filters use media that are substantially heavier than the process liquid being filtered, so that the media sink to the bottom of the filtration vessel forming a bed of filter media. This bed may range from several inches to several feet in thickness. Nominally, in a conventional bed filter, the process liquid is pumped, or allowed to flow (via gravity), downward through this filter bed. As the particulate-laden liquid passes through the bed, the particulates are strained from the liquid and the cleaned liquid exits at the bottom of the bed.

The bed removes the particulate contaminants via one of two processes. First, the larger particulates, which are unable to pass through the spaces between the bed grains, are trapped at the top surface of the bed. This straining effect produces a layer or crust (also called a cake) of large contaminant particles, which builds up on the surface of the bed, a mechanism called surface filtration. This cake can actually enhance the performance of the bed by helping to capture more contaminant particulates, which are retained in the crust itself, because they cannot pass through the spaces between the contaminant particles that form the crust.

Second, smaller particulates, which are carried into the bed by the liquid flow are intercepted by the bed's grains as they follow the convoluted flow pathways taken by liquid as it passes through the bed, a mechanism called depth filtration. Although smaller particulates are captured in the bed material, the smallest particulates may not be captured, as they can continue to flow through the bed and exit with the semi-cleaned liquid at the bottom of the filter bed.

Ultimately, the particulates sequestered by the bed accumulate, making it more difficult for liquid to flow downward through the bed, and thus the flow rate declines. The pressure required to force liquid through the bed then increases, and presents an excellent indication of the growing need to cleanse the bed of the accumulated particulates. Cleansing is achieved by a process of backwashing or back flushing.

During backwashing, clean liquid is vigorously pumped upwards from the bottom of the particulate bed. This upflow of liquid causes the bed to expand slightly, freeing the captured particulates and washing them upwards and out of the bed. As the bed expands, the bed particles have less interference with each other and thus settle faster, matching the up-flow rate of the liquid. This effect prevents the bed particles from being washed out of the bed along with the contaminant particulates. Typical backwash conditions are 5 to 15 minutes duration with the bed volume expanded 15 to 30%.

Although sand and diatomaceous earth filters have been successfully applied to a wide variety of filtration problems, they have a number of limitations and drawbacks. One of the most serious problems involves maintaining bed homogeneity during operation. Inhomogeneities in the bed include, for example, cracks that offer regions of less flow resistance. Such cracks lead to the formation of channels in the bed, poor distribution of the liquid flow through the bed, and thus very low particulate removal. Such inhomogeneities may also allow air to be trapped in the bed, also leading to the formation of channels and poor distribution of the liquid.

In addition, the size and cleanliness of the bed particles are extremely important to the success of the filtration process; a bed composed of large particles allows significant numbers of small particulates to pass through the filter bed along with the process liquid. On the other hand, beds composed of smaller particles can quickly become clogged with small contaminant particles, thus rendering the filter bed ineffective. The bed particles can also adsorb organic compounds on which microorganisms feed. Microbes growing on these organic compounds can bind the filter particles together and clog the bed, thus decreasing its effectiveness and shortening the interval until cleaning.

To maintain cleanliness, large volumes of clean liquid are required to backwash and clean conventional filter beds, leading to large volumes of contaminated liquid which must be treated or properly disposed. Even though backwashing is fairly effective for removing many of the particulates captured by the filter, some particulates may adhere so strongly to the bed particles that they are virtually impossible to remove. These residual contaminants reduce the effectiveness of the filter and significantly impair filter performance. Additionally, the specific gravity of the contaminant particulates is often equal to or greater than the specific gravity of the particles that make up the filter bed. In such circumstances, it is impossible to separate the heavy contaminant particles from the bed particles through a backwash process, and backwashing is therefore not effective as a cleaning method.

Thus, one of the most crucial problems with these systems, which is common knowledge to practitioners of this art, is the ineffectiveness of backwash systems for cleaning the filter media (i.e., Amirtharajah, 1978). As a consequence, in many situations, the contaminated bed cannot be cleaned and instead must be replaced with new bed material. In fact, during normal operation, both sand and diatomaceous earth filters require that the media be discarded after a certain level of media contamination has been reached. In applications that involve heavy particulate contaminant loads in the process liquid, these media may have to replaced on a daily or weekly basis, which is not economical.

An alternative method of bed filtration uses a filter bed composed of buoyant filter media particles. In this method, the media form a bed in which the majority of the media floats just beneath the surface of the process liquid. The process liquid is pumped into the bottom of the filter chamber and flows vertically upward through the bed. As the process liquid passes through the bed, contaminants are filtered from the liquid via the surface and depth filtration mechanisms described above.

Prior applications of this buoyant media method to the filtration of water (e.g., Banks, U.S. Pat. No. 4,885,083, Hsiung, et al., U.S. Pat. No. 4,608,181) have described the use of a filter media with a specific gravity of 0.7 to 0.8 or greater. For example, in Hsiung et al., the media is exactly defined as having a specific gravity of no lower than 0.8 and "most preferably" no lower than 0.9. Banks precisely specifies the specific gravity of buoyant media as 0.75 to 0.9, and "substantially equal to 0.90 to 1.0".

Nominally, the buoyant media particles used in this type of application are also of a larger diameter than the media particles used in either sand or diatomaceous earth filters. For example, Hsiung, et al. specify the particle diameter as being preferably in the range of 1.5 to 20 mm, in contrast to the sizes of sand particles (about 0.35 mm in diameter) and diatomaceous earth (about 100 microns in diameter). Due to the relatively large size of the media particles, these buoyant media filter beds are not optimized to remove small particulate contaminants. In general, they are designed to perform larger particulate contaminant removal and some degree of biofiltration of the process liquid by the bacterial biofilm adhering to the media particles.

This buoyant media filter system, as described in the Hsiung et al. patent, actually achieves optimal operation with the media in a partially clean state. In fact, Hsiung et al. write " . . . it is advantageous to leave a certain amount of deposited solids in a buoyant media filter, as the solids reduce the size of the pores of the filter and assist in filtration". This requirement is often referred to as "ripening" the filter, and it means that a significant portion of the filtration capability achieved by Hsiung et al. is provided by the contaminant particles that were previously filtered and retained by the media or the microbial biofilm covering the media.

The requirement to use a "ripened" filter media bed dictates that the performance and operation of the media bed cannot be accurately characterized or predicted, as both depend on the amount and nature of the contaminant material(s) previously deposited on the buoyant media particles during the ripening process. This lack of predictable operation makes it very difficult or impossible to develop an optimal design for this type of filter.

In addition, backwashing must be performed in a gentle fashion to preserve the "ripened" layer on the filter media. If the backwash is especially vigorous, particles that were adhering to the buoyant media will be removed from the media and a portion of the buoyant media's filtration capacity would thus be lost. That capacity cannot be regained until the filter has "ripened" by again filtering a sufficient amount of contaminant particles and retaining them in the filter media in order to replenish the loss.

Thus, backwashing is typically performed by gently agitating the bed with air bubbles introduced beneath the bed and allowed to flow upwards through the bed or by gentle streams of water directed into the bed to agitate and dislodge some of the adhering contaminant particles. Accompanied by normal or reduced flow of process liquid through the buoyant media bed, these backwash methods flush only a portion of the retained contaminants from the filter bed.

The backwash system described by Hsiung et al. is the type that uses air injection and the normal flow of raw process liquid to wash excess particulates out of the media. Because the buoyant media particles have a specific gravity close to that of water, it is easy for these gentle agitating mechanisms to move the mostly submerged media around in the process liquid, and thus dislodge some of the contaminant particulates adhering to the media. Consequently, these mechanisms provide the required minimal degree of cleaning of the filter media bed. Using this method of backwashing, the amount of solids flushed from the buoyant media depends on total wash volume. However, because the media particles have a specific gravity close to that of water, they are moved easily by the backwash mechanism, and cannot be thoroughly cleaned.

Unfortunately the problems encountered in using small diameter non-buoyant media, such as sand or diatomaceous earth, are exacerbated when using small diameter buoyant media. Due to the high surface area of the small diameter media, contaminant particles that fill the interstices between the media particles can act like a glue which makes the media particles adhere to one another and form clumps which lead to the formation of non-homogeneities within the bed (just like the problem that occurs in small diameter non-buoyant media). Because the backwash systems must be relatively gentle in nature for the filter to retain its "ripened" state, these non-homogeneities cannot be removed from the bed, and the bed performance declines. This problem dictates that small diameter filter media not be used in buoyant media applications, because the ripening process itself severely limits the efficacy of the filter bed.

In addition, for cost savings, many of these buoyant media filter systems do not employ a separate backwash pump or backwash water storage system. As a result, raw process liquid is used to backwash the bed media. In these designs, maximum cleanliness of the media particles cannot be achieved because a separate, isolated pump and process liquid storage system are not utilized to provide a source of clean process liquid for backwashing. Thus, although such buoyant media filters have desirable characteristics for specific filtration applications, they do not overcome the above-stated disadvantages of conventional media bed filters.

In view of the above disadvantages with conventional apparatuses and methods, it is the principal object of the present invention to overcome the above-discussed disadvantages associated with prior media liquid filtration systems.

Another object of the present invention is to provide a liquid filtration apparatus and method that embodies a filtration bed formed from super-buoyant particles having a specific gravity less than one half that of the liquid being filtered.

A still further object of the invention is to provide a liquid filtration apparatus that embodies a filtration bed that floats on the liquid to be filtered.

Yet another object of the invention is to provide a new and improved filtering system for the removal of particulate contaminants from process liquids which incorporates a high-efficiency back-washable filter bed.

A still further object of the invention is the provision of a liquid filtration apparatus and method that in one aspect incorporates a pair of filtration housings connected in parallel.

Yet another object of the invention is the provision of a liquid filtration apparatus and method that in another aspect incorporates a pair of filtration housings connected in series.

The invention includes other objects and features of advantage, some of which, with the foregoing, will be apparent from the following description and drawings. It is to be understood that the invention is not limited to the embodiments illustrated and described, since it may be embodied in various forms within the scope of the appended claims.

SUMMARY OF THE INVENTION

The invention disclosed herein overcomes the disadvantages encountered with prior bed filtration systems by providing a filtering apparatus which incorporates a super-buoyant filter medium having a specific gravity very substantially lower than that of the process liquid being filtered. This requirement permits a majority of the medium to float on top of the process liquid.

In contrast, as described above, previously-described "buoyant media" filters use filter media which are at or near neutral buoyancy in the process liquid, and therefore float with the majority of the media just below the surface of the process liquid. For example, Hsiung et al. specifically define buoyant filter media as having a specific gravity of no lower than 0.8 and "most preferably" no lower than 0.9. Using a specific gravity value of 0.9, the amount of a buoyant media particle that floats above the surface of the process liquid can be calculated using fundamental physical principles.

Based on a specific gravity of 0.9, a sphere 1 cubic centimeter in volume will have a mass of 0.9 grams. If that sphere is placed in water, it will displace 0.9 cubic centimeters of volume. This displacement means that 0.1 cubic centimeter of the sphere, or 10%, will be visible above the surface of the water as shown in FIG. 1, neglecting surface tension and other effects described below. Thus, 90% of the buoyant media sphere will actually be immersed beneath the water's surface. If several spheres are stacked on top of one another to increase the thickness of the media layer, the relationship remains the same, so that 90% of the media thickness will still be immersed in the water and 10% will be exposed above the water.

In contrast to buoyant media, super-buoyant media form a mass in which the majority of the media floats on top of the process liquid (i.e., in which the media have a specific gravity less than one-half that of the process liquid). For clarity, this difference is illustrated in FIG. 1. The use of super-buoyant media that float principally on top of the process liquid is a design feature that provides unique capabilities not provided by the buoyant media filter designs described in Hsiung, et al., Banks, Muller et al., or any of the other filtration systems described previously.

It must be emphasized that the distinction between filter media floating submerged beneath the surface of the process liquid and filter media floating on the surface of the process liquid is critical in determining the unique operational characteristics of the each kind of filter. For example, when using buoyant media in water, the filter media (A in FIG. 1) behave principally as though they are part of the water mass. Thus any horizontal movement of the water containing such media drags the media along with it. An injection of air bubbles into such a media bed will also move the media particles because they are very close to neutral buoyancy, and this neutral buoyancy renders them easy to move.

In contrast, super-buoyant media filter particles (B in FIG. 1) do not behave as though they are part of the process liquid mass. Instead, they form a mass that floats on the surface of the process liquid, largely independent of, and isolated from, the movements of the process liquid beneath. Horizontal movements of the liquid beneath the floating, super-buoyant media have virtually no effect on the media, and thus such movements do not tend to cause significant movement of the super-buoyant media bed. In essence, the super-buoyant media described herein behave much like a cork floating on a water surface.

To achieve this effect, the super-buoyant media particles must have a nominal specific gravity less than 50% of the specific gravity of the process liquid to be filtered. In practice, utilizing a super-buoyant media with the lowest possible specific gravity maximizes the effectiveness of both the filtration and backwashing mechanisms. For example, in the filtration of particulate contaminants from water, good performance can be achieved when the specific gravity of the super-buoyant filter media is less than or equal to approximately 0.25-0.35, but the best performance is achieved when the specific gravity of the super-buoyant media is in the range of 0.01 to 0.05. These super-buoyant media are typically selected from materials such as lightweight plastics (e.g., expanded polystyrene), or hollow microspheres formed from glass or ceramic.

The use of such super-buoyant media insures that nearly all of the bed formed by the filter media floats on top of the surface of the water, with only a minimal amount of the media submerged beneath the surface of the liquid (FIG. 1). This is completely different from the physical behavior of filter beds composed of buoyant media particles described previously. It is also completely unlike the sand and diatomaceous earth filter beds described above for water filtration, neither type of which have any buoyancy in water.

Due to the significant differences in specific gravity between the media and the process liquid, super-buoyant media produce a highly advantageous means of naturally, gravimetrically separating both clean and contaminated filter media and process liquid into separate "phases". This natural, spontaneous separation is crucial to both sustaining the performance of the filter bed and to maintaining the effectiveness of backwashing such that each backwash cycle produces a reproducibly clean filter bed to insure uniform, predictable filter performance.

The uniqueness of the super-buoyant media approach stems from the fact that when such super-buoyant filter media are used, the aggregate forces acting on the media produce a natural, spontaneous, gravimetric separation of the filter media and the process liquid into two different phases. This occurs in the same manner that a well-agitated mixture of oil and water separates naturally into two distinct phases when a mixture of the two is allowed to reach a static equilibrium. Thus, the super-buoyant media of the filter described here is one of its most novel and unique aspects, as it provides a method for naturally, easily, and efficiently separating the filter media and trapped contaminants from the process liquid.

As described above, implementation of the super-buoyant media method requires that the filter media must float principally on the surface of the process liquid. This requirement is satisfied primarily by selecting media that are much lighter in density than the process liquid. Thus, selection of the appropriate media to implement this filtration method must be initially dictated by the specific gravity of the process liquid. However, selecting media with a low specific gravity is not always sufficient to identify an optimal filter media for filtration of a specific process liquid. Other factors can also influence the effectiveness of the super-buoyant media as a filter for a given process liquid, and therefore must also be considered in selecting the type of filter media.

One of the additional factors in super-buoyant media selection is the attraction of the filter media and the process liquid for one another. For example, when the process liquid is water, hydrophilic filter media (which tend to maximize surface contact with water) will behave in a much different fashion than will hydrophobic filter media (which tend to minimize surface contact with water). Due to the attractive effect, hydrophobic media and the process liquid tend to separate into two phases more quickly. As a consequence, in conjunction with the buoyancy effects described above, hydrophobic super-buoyant media typically provide a better filter in water or a water-based process liquid than will hydrophilic media.

The second factor in selecting the type of super-buoyant filter media is the attraction of the filter media particles to one another. If, for instance, there is a weak electrostatic attraction between the filter media particles, the particles tend to adhere to one another. As a consequence, through selection of media material (e.g., plastic, ceramic, or glass), this electrostatic effect can be utilized to assist the filter media in forming a coherent mass that floats better on the surface of the process liquid, as well as assisting in attraction and removal of contaminant particles from the process liquid. If the electrostatic attraction between the media particles is too great, however, the particles will tend to stick to one another too strongly, thus forming clumps that can cause bed inhomogeneities or interfere with the removal of contaminants from the bed during backwashing. In this later case, it may be necessary to include in the filter housing, a means of electrically grounding the media to remove the charge The third factor to be considered is the geometric shape of the filter media particles. The filter bed generally works best when the media particles are uniformly spherical in shape as this shape allows the most efficient packing of the media particles. Deviations from a spherical shape can lead to inhomogeneities in the bed, which in turn can decrease the effectiveness of the filter and significantly complicate cleaning of the media.

The final factor that must be taken into account in selecting the type of super-buoyant media is the nature of the process liquid and the physical conditions under which the process functions. Practitioners of the art will easily recognize that there are many organic solvents in which plastic filter media would dissolve, and therefore would not be suitable. In such cases, the use of ceramic or glass microspheres is dictated. In other cases, such as strong acids or bases, the process liquid is extremely corrosive, and corrosion-resistant plastics or glass microspheres must be used. In some cases, the process liquid may operate at elevated temperatures or pressures that would rapidly degrade some types of plastic filter media, and ceramic microspheres would be required.

In some situations, once a super-buoyant media has been selected based upon the factors described above, it may still not be optimal for the filtration of a particular process liquid. In those situations, it may be possible to modify the media so that it performs better. For example, the surface of the super-buoyant media particles may be altered by subjecting the particles to various physical or chemical treatments, including high temperature, high pressure, chemical etching, etc. These treatments are capable of modifying the surface of the media particles, for example, making it more or less hydrophobic in some cases or more or less hydrophilic in others. It is also possible to apply a polymer coating to these media particles. Such polymer coatings may determine the surface properties of the media directly, or the coatings may contain additional embedded chemicals that produce different surface properties for the media. These embedded chemicals can be selected to optimize specific aspects of the super-buoyant media, thus affecting the manner in which the filter functions.

Once the type of super-buoyant media material has been selected based upon the specific gravity of the process liquid and the other characteristics outlined above, it is essential to determine the desirable size range of the super-buoyant media particles. Ideally, the super-buoyant media particles should be as small as possible, and should be chosen based upon the size of the contaminants to be removed. Candidate media are currently available in diameters as small as 10 μm and as large as several cm.

The performance of the filter is also influenced by the thickness of the media layer. The use of thicker beds composed of larger diameter media particles generally offers good depth filtration. The use of thinner beds composed of smaller diameter media particles generally offer good surface filtration. By mixing various diameters of media particles and adjusting bed thickness, the efficiency of the filter bed can be tailored to meet a variety of filtration problems. Using smaller diameter media or thicker media beds carry a power penalty, however, as a more powerful, high pressure pump is required to force the process liquid through such a super-buoyant media bed. To resist the pressure required to move the process liquid through these beds, a strong, multi-component "sandwich" is used as a bed restraint 16 (FIGS. 2, 3). In both FIGS. 2 and 3, a perforated metal plate 16a provides support for the bed restraint 16. An intermediate layer of coarse screen 16b provides additional support as well as facilitates passage of the process liquid through the bed restraint 16. The final layer of the "sandwich" is either a very fine mesh screen 16c (FIG. 2) for medium or coarse filter media, or a sheet of permeable metal or plastic material 16d (FIG. 3) for fine filter media.

In some situations, a thin layer of super-buoyant media is a preferable choice for filtering process liquid. In these situations, it may be necessary to insure a uniformly thin media layer by adding a ring grid 16e (FIG. 4) to the bed restraint 16 described above. As described above, this bed restraint 16 consists of a perforated metal plate 16a, an intermediate layer of course screen 16b and a final layer of fine screen (not shown) or a sheet of permeable metal or plastic material 16d. The ring grid 16e, in combination with the directed flow of the process liquid, or, occasionally, in conjunction with other mechanical rotating mechanisms, assists in maintaining a uniform, thin media layer to maximize the surface filtration provided by the media. Other grid designs (e.g., where the open area is filled with small square, rectangular, or hexagonal cells, rather than a single large central open area), may also be used to assist in maximizing the amount of surface filtration achieved.

Smaller media and thicker beds also make it more difficult to clean the filter when it becomes loaded with contaminants. However, the use of super-buoyant media provides an important and unique advantage in the process of cleaning such filter beds to remove trapped contaminants.

The most effective way to clean a super-buoyant media filter bed is to use a rigorous spray of clean process liquid while forcing the entire bed to move through the spray (FIGS. 5A-5F). Beginning with a normally-operating filter (FIG. 5A) in which the process liquid is flowing upward through the media bed 14, cleaning is accomplished by first shutting off the flow of process fluid through the filter and then draining the process fluid from the filter housing 13 (FIG. 5B), thus lowering the level of the process liquid in the filter housing 13 until the entire filter bed 14 is below the backwash spray nozzle(s) 44. Next, the drain valve (not shown) is closed and the backwash spray 5 of clean process liquid is turned on (FIG. 5C). As it accumulates in the housing, the level of the process liquid in the filter housing 13 rises (FIG. 5D). As the process liquid level in the filter housing rises, the super-buoyant media 14 (floating on the surface of the rising process liquid) also rises (FIG. 5E). This forces all of the media in the filter bed 14 to pass through the intense backwash spray 15, which scours each media particle and washes off any adhering contaminants, thus insuring that each media particle is very thoroughly cleaned. The backwash spray 15 is continued until the level of the process liquid in the filter housing has risen above the backwash nozzle 44 (FIG. 5F). In the cleaning process, all of the contaminants captured by the media bed 14 are washed to the bottom of the filter housing 13 for removal. Although one backwash cycle is usually sufficient to clean a super-buoyant media bed, this backwash sequence may be repeated as many times as required to provide the desired level of media cleanliness. The amount of clean process liquid required for a single backwash is usually no more than 2-3 times the volume of the filter media bed.

It should also be noted that although, in the embodiments described below, the filter housing is assumed to be cylindrical in shape, other housing shapes may be selected for specific applications to increase either or both the filtration efficiency or the backwashing efficiency. Several alternative, non-cylindrical housings 13a-13c are pictured in FIG. 6. All of these alternatives provide a larger filtration area and a "necked-down" backwashing section 10. These features enhance the total area of the super-buoyant media available for filtration, as well as providing a means of concentrating the backwash spray to increase its cleaning effectiveness.

The novel backwash mechanism described herein makes it possible to thoroughly scour and clean small diameter filter media, thus providing an unprecedented level of cleanliness in the backwashed media. As a consequence, the media does not have to be discarded nearly as frequently as previous filters which used small diameter, non-buoyant media, thus making the super-buoyant media filter design significantly more economical to operate as well as more efficient in removing contaminants.

The cleaned super-buoyant media bed retains its initial filtration characteristics, and performs in a repeatable fashion after every backwash cycle, all without requiring any sort of "ripening". The life of the media is also very significantly extended over that experienced with non-buoyant media. In addition, because of the high efficiency of the backwash mechanism, very little particulate-laden waste process liquid is generated. Thus, this unique, novel backwash method provides a capability that has been lacking in filtration technology, one method that has not been directly addressed by any known existing patents or any known products on the market.

During normal operation, the liquid to be filtered is withdrawn from a process tank or process stream and pumped under pressure through one or more filter housings containing the aforementioned super-buoyant bed medium. The liquid being filtered is pumped into the dry housing at the bottom, elevates the filter bed by floatation to a position where further elevation is restrained and then rises through the restrained bed medium, exiting the filter housing at the top.

A valve in the exit line at the top of the housing directs the filtered liquid either back into the process tank or stream, or into a clean liquid storage tank. A small storage tank in the filtration system provides a volume of filtered liquid for use in backwashing the filtered medium to clean it by removing the particulates it strains from the process liquid. A valve in the entry line is closed when the backwash is performed to prevent backflow of contaminated liquid into the process stream. A second valve, in the exit drain line, is opened to direct the "dirty" liquid into a storage chamber where it is collected until it can be properly disposed or recycled.

In one aspect thereof, the present invention is directed to an apparatus for filtering particulate contaminants from contaminated liquid process streams, such as, by way of example, from the deionized water used during electrical discharge machining. The apparatus includes a primary pump with a liquid inlet from the process stream or process storage tank and a liquid outlet to the filter hosing a chamber. The filter chamber includes a liquid inlet from the primary pump and a liquid outlet that returns the filtered liquid to the process stream or to a clean process liquid reservoir. The filter chamber contains the filter bed which acts as a strainer to remove the particulates from the process stream.

In another aspect, the present invention is directed to a liquid filtration apparatus that includes a filter bed composed of a particulate medium that has a substantially lower specific gravity than that of the process liquid to be filtered. The particle size and nature of this bed medium are determined by the identity of the process liquid to be filtered. As the process liquid is pumped through this filter bed, the particulate contaminants are strained from the liquid by one or both of the aforementioned methods.

In a third aspect thereof, the present invention is directed to a liquid filtration apparatus that includes a backwash system that incorporates a backwash reservoir to store cleaned process liquid for backwashing, a backwash pump, a single or plurality of backwash nozzles, a backwash valve, and a backwash waste liquid/particulate collection reservoir. During the backwash cycle, stored cleaned process liquid is withdrawn from the backwash reservoir by the backwash pump and forced through the spray nozzles(s). This backwash spray, in conjunction with alternately opening and closing of the backwash valve at the bottom of the filter chamber, serves to efficiently clean the strained particulate contaminants from the bed and wash them into the waste liquid/particulate collection reservoir.

The above-mentioned and other features and objects of the invention and the manner of obtaining them will become apparent and the invention will be better understood by references to the following description of preferred embodiments of the invention taken in conjunction with the accompanying drawings.

Figure 1:
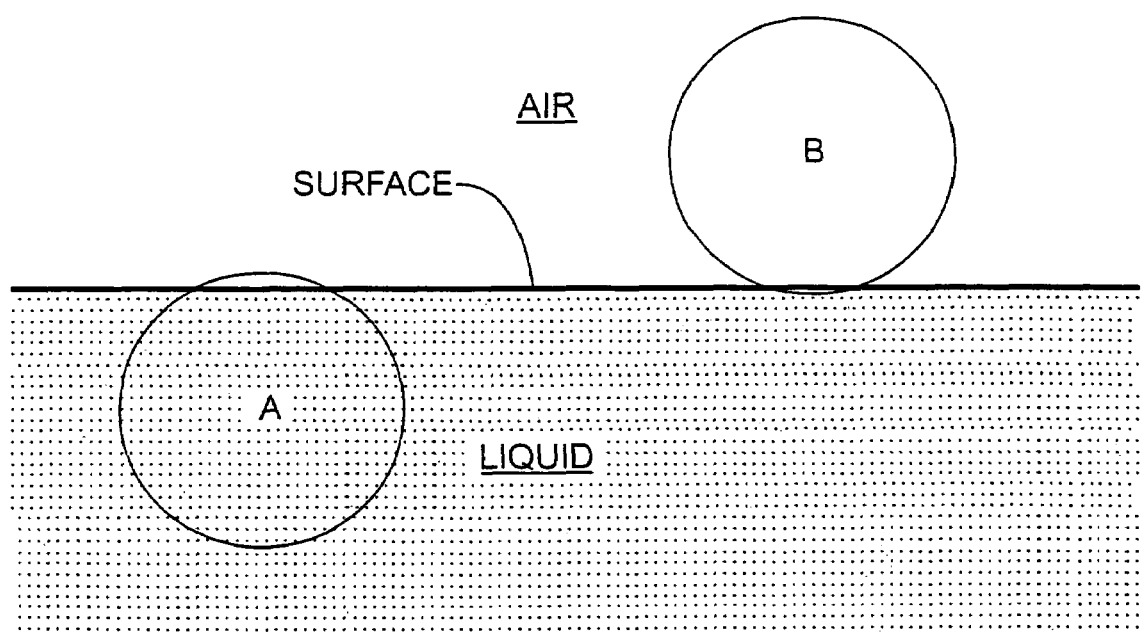
FIG. 1 is a diagrammatic illustration of the difference between buoyant media particles (A) and super-buoyant media particles (B) when the particles are placed into the process liquid to be filtered.

Corresponding reference characters indicate corresponding parts throughout the several views of the drawings. The exemplification herein illustrate preferred embodiments of the invention in specific forms thereof, and such exemplifications are not to be construed as limiting the scope of the disclosure or the scope of the invention as set forth in the appended claims.

DESCRIPTION OF THE PREFERRED EMBODIMENTS

Single Filter Housing Embodiment

In this embodiment (FIG. 7), a central control system designated generally by the numeral 54 is used to monitor the sensors installed in the filtration system, and to turn "ON" and "OFF" all of the actuators (pumps and valves) required to operate the system. This control system may be operated either by manually actuated switches or by electronic switches activated by an embedded microprocessor. Although using a microprocessor makes the system somewhat more complex, it enables more efficient operation of the system as well as providing unattended operating capability during periods when no personnel are available to manually control the system.

During normal operation, the process liquid to be filtered is withdrawn from a reservoir 2, connected by a conduit 3, to a pump priming chamber 4. Alternatively, the liquid may also be withdrawn directly from a process liquid stream. Although not absolutely required, the use of the pump priming chamber 4 helps prolong the life of the primary liquid pump 7, by ensuring that the pump does not run "dry". Running "dry" (i.e., run without liquid in the pump head), may damage the pump.

As the liquid is removed from the pump priming chamber 4, through a conduit connecting the pump priming chamber 4 to the primary fluid pump 7, a partial vacuum is created in the pump priming chamber 4 and thus in the conduit 3 connecting the reservoir 2 to the priming chamber 4. The vacuum pulls process liquid from the reservoir and establishes a supply flow of the process liquid to the primary pump 7. As the liquid exits the primary pump 7, it is pumped through a conduit 8 to a normally-open valve 9 and into a connecting conduit 11 that attaches to the cylindrical filter housing 13 through the filter housing inlet 12. It should be understood that when valves are designated herein, such valves may be manually actuated or electronically actuated, and preferably the latter.

After passing through the filter housing inlet 12, the flowing liquid spreads out, and flows upwards through the filter housing 13, causing the filter bed 14, which floats on top of the liquid, to rise in the housing 13. The filter bed 14 consists of small diameter super-buoyant particles having a specific gravity substantially lower than that of the liquid being filtered, and selected to be within a specific size range, nominally having a diameter between 0.1 micron and 25.4 mm. The size and material composition of the filter bed particles, as well as the bed volume and filtration area, are determined by the process liquid filtration requirements, including the size and nature of the particulates to be removed from the process liquid. The super-buoyant particles which compose the filter bed are typically formed from plastic, glass or ceramic materials, but in any event these particles must have a specific gravity less than one half that of the process liquid being filtered.

As the process liquid flows into the filter housing 13, the level of the process liquid rises in the housing. The super-buoyant media bed 14, which is floating on the rising process liquid, rises until it eventually touches the bed support 16 near the top of the filter housing. This support restrains the bed media, and prevents it both from rising any further in the housing 13 and from flowing out of the filter housing 13 along with the liquid being filtered. Although the filter bed 14 itself is prevented from rising any further in the housing 13, the process liquid continues to rise and flows through the filter bed 14 as it is pumped into the housing 13 by the primary pump 7.

Figure 2:
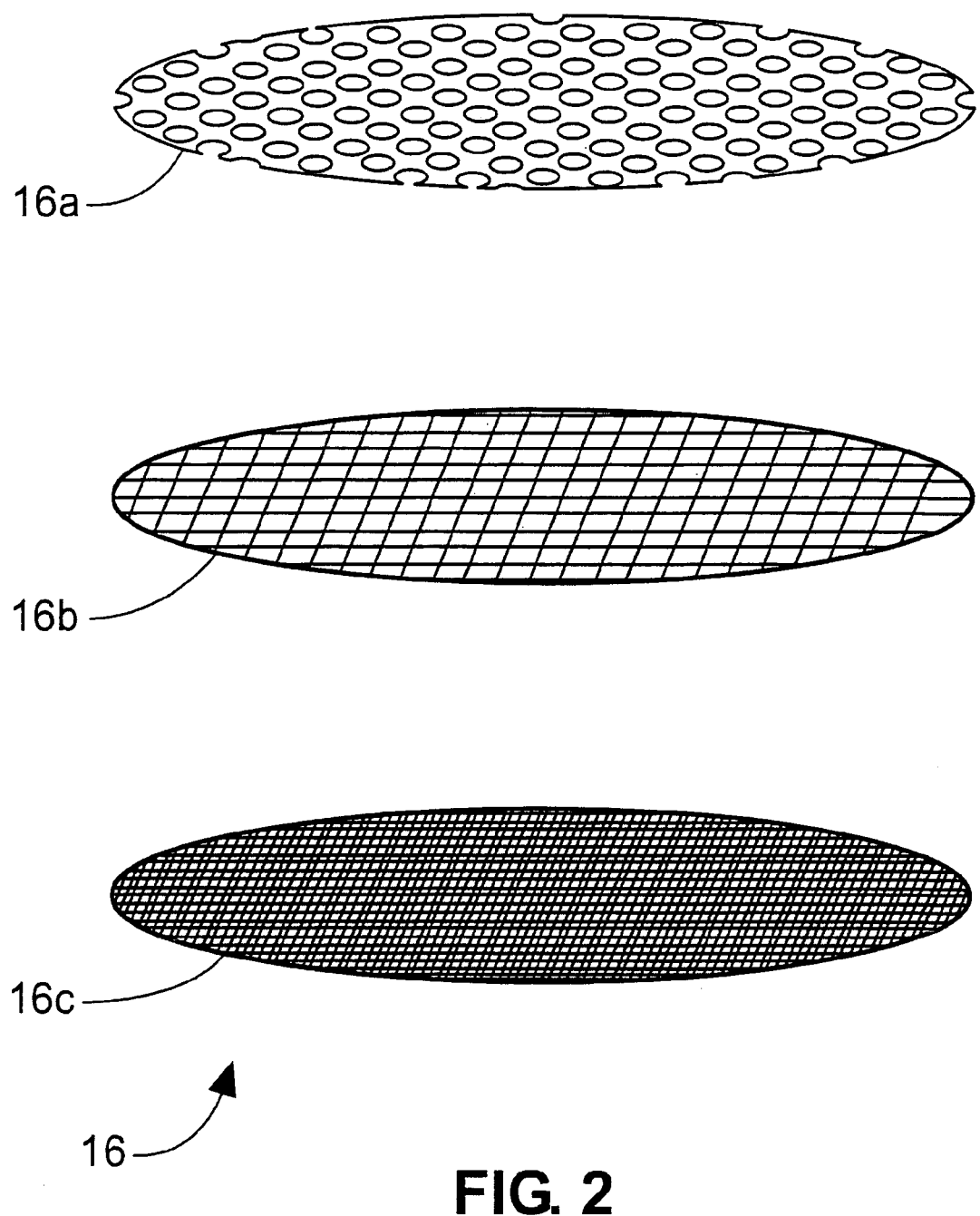
FIG. 2 is a diagrammatic view which presents a detailed view of the filter bed retaining plates for coarse and medium filter media (mean media particle diameter greater than 100 microns in diameter).
Figure 3:
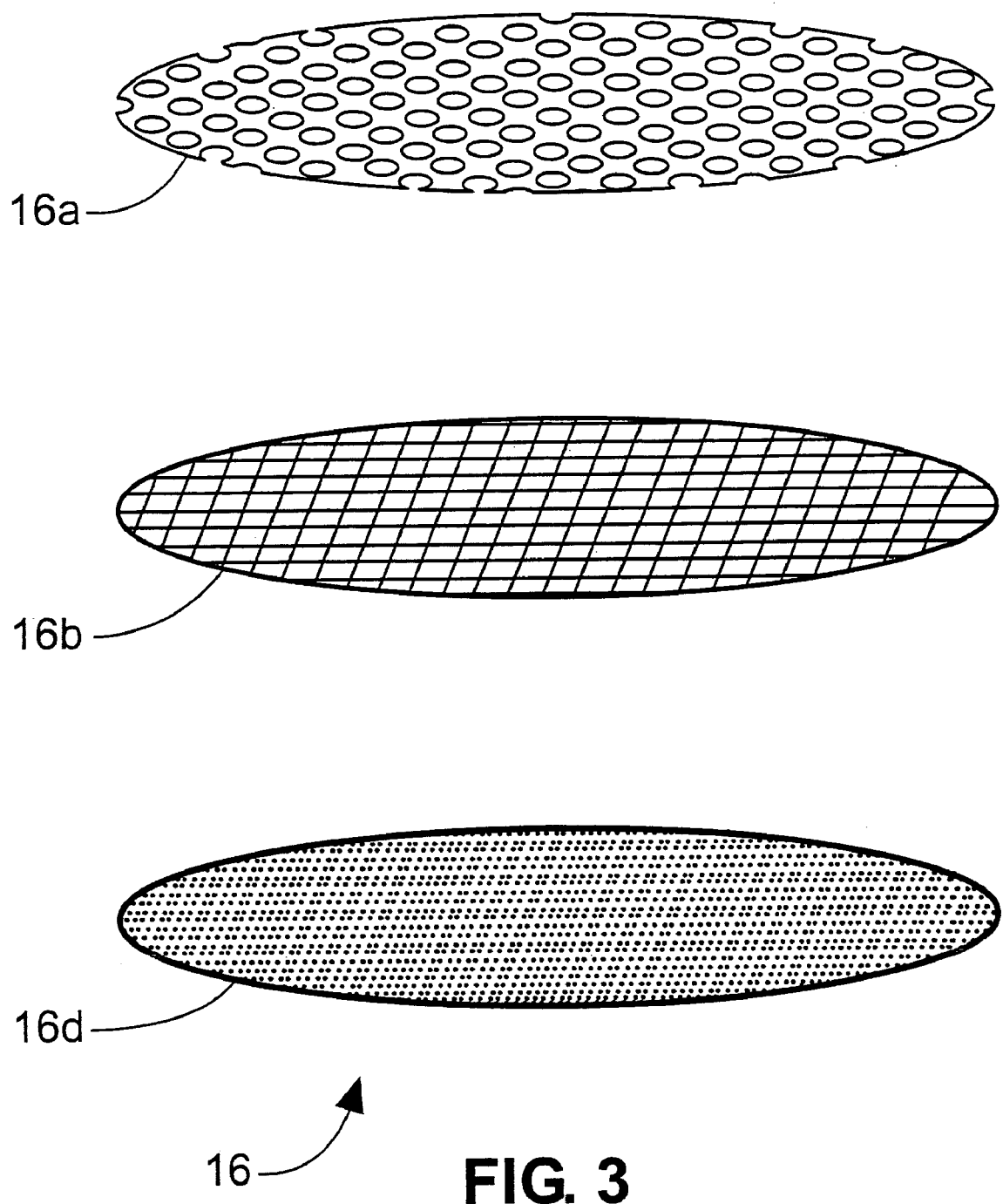
FIG. 3 is a diagrammatic view which presents a detailed view of the filter bed retaining plates for fine filter media (mean media particle diameter less than 100 microns in diameter).
Figure 4:
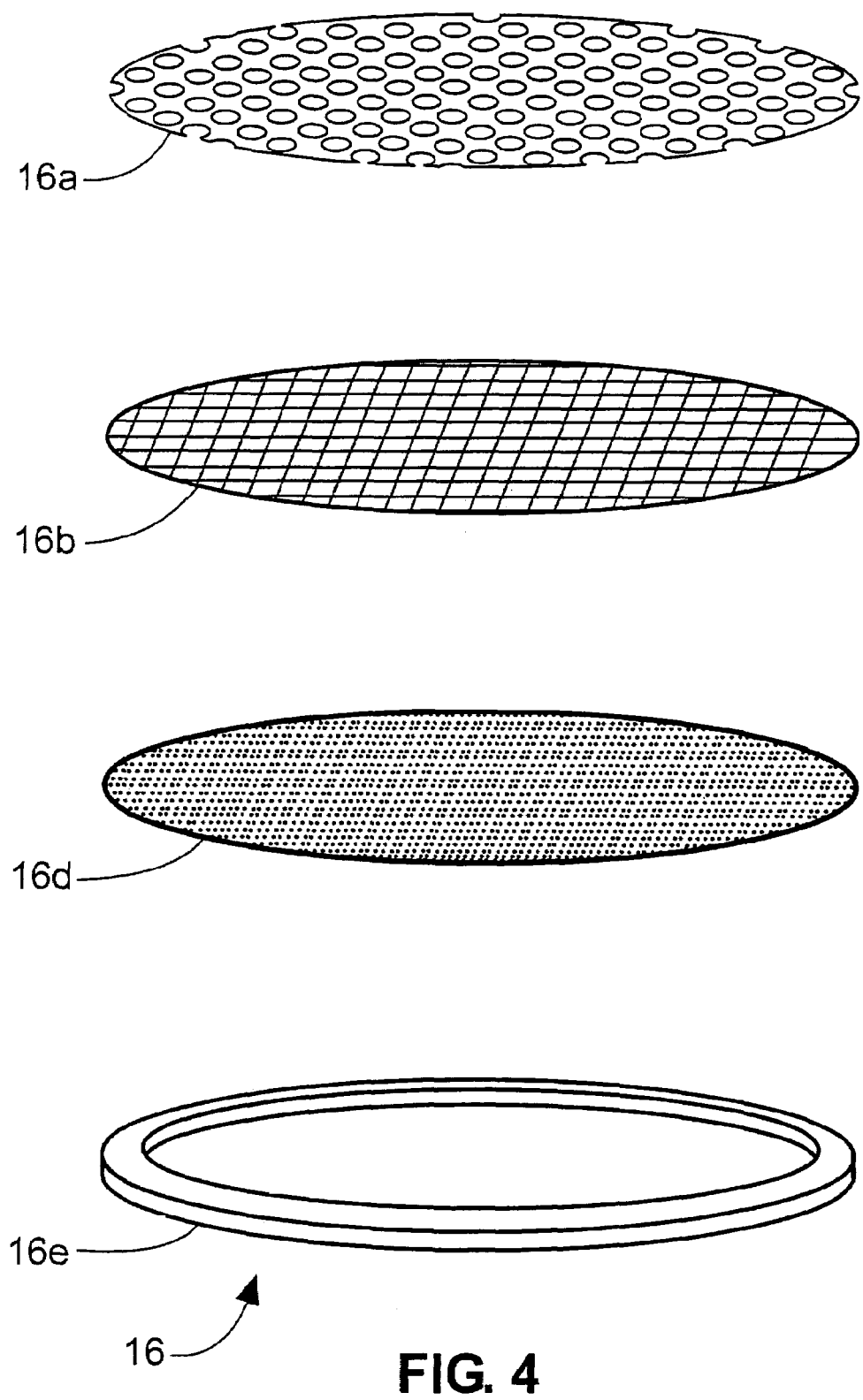
FIG. 4 is a diagrammatic view which presents a detailed view of the filter bed medium retaining plates for fine filter media (mean media particle diameter less than 100 microns in diameter), incorporating a ring grid to control bed thickness.
Figure 5:
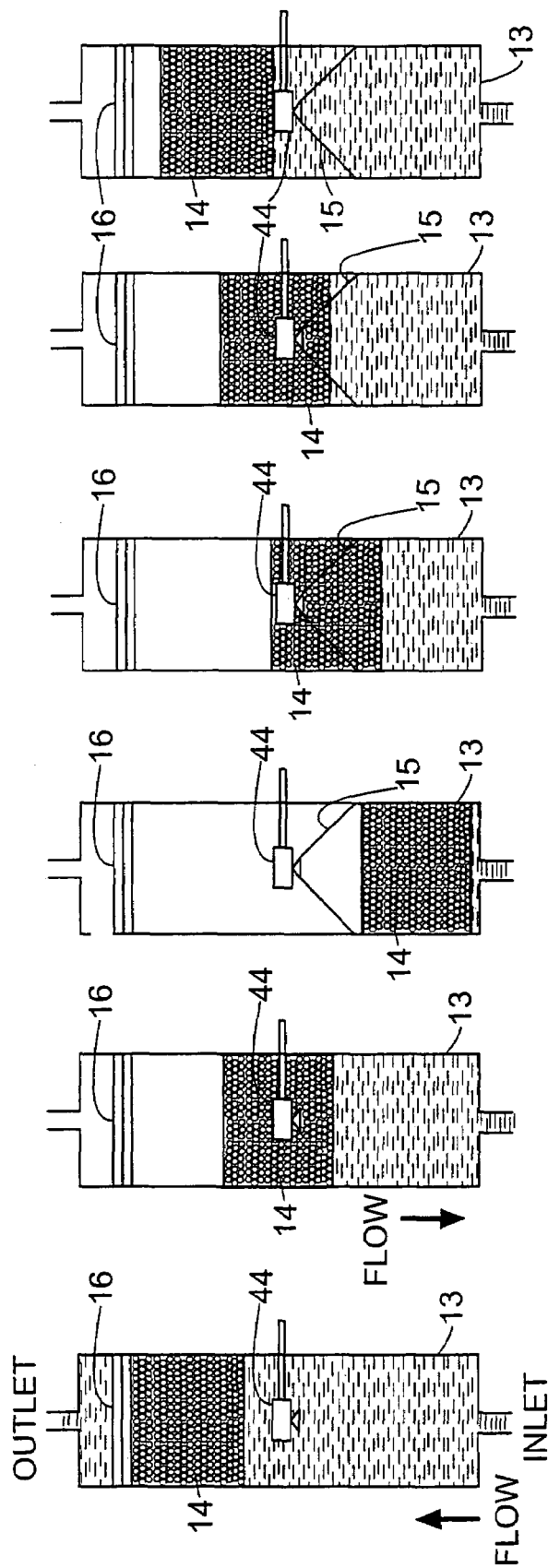
FIGS. 5A-5F are a diagrammatic view of the backwash process that illustrates the various positional relationships of the filter bed to the backwash spray nozzle during a complete filter and backwash cycle, according to the present invention.
Figure 6:
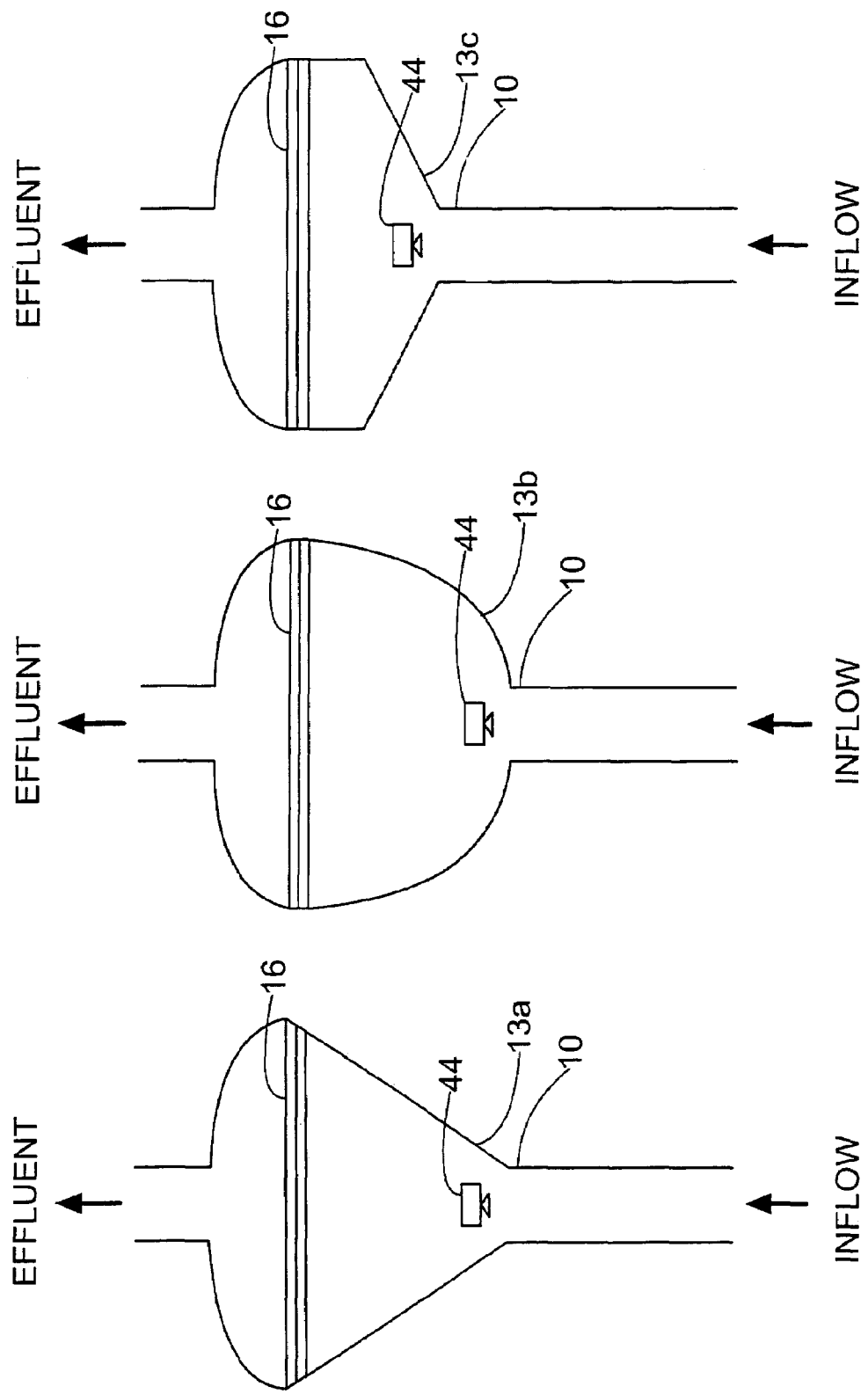
FIG. 6 is a diagrammatic cross-sectional illustration of several different shaped filter housings which have large surface areas for retaining the super-buoyant media and narrower areas which concentrate the backwash spray to provide maximum cleaning of the media.

As the liquid level rises, the liquid is filtered as it flows upwards through the filter bed 14 and then through the bed support 16 and into the top of the filter housing. The bed support 16 thus also provides a final filtration barrier to the particulates carried in the liquid. The bed support 16 is nominally formed from a multi-layer "sandwich" (FIG. 2) comprising a perforated metal plate 16a, and two or more layers of screen 16b and 16c. Alternatively (FIG. 3), the "sandwich" may also comprise the aforementioned perforated metal plate 16a, with a single layer of screen 16b, and a layer of semi-permeable membrane or sintered permeable plastic or metal material 16d.

Selection of these constituent layers depends upon the size of the filter bed particles. The fine mesh screen or membrane layer is positioned at the lower face of the bed support 16 immediately next to the filter bed media. A medium mesh screen is positioned in the center to provide structural support for the fine layer, and the perforated metal is last and provides structural stiffening for the entire support assembly. The fine material, whether screen or permeable membrane, is preferably the layer that directly contacts the filter bed media. The other layers serve to provide structural support and enhance liquid flow through the bed support. This multiple layer design provides the strength necessary to retain the bed media under working filtration pressures that may be as high, for example, as 75 to 150 psi. Preferably, the working filtration pressures may range from approximately 20 to 150 psi. A broader range may of course be utilized under appropriate conditions related to the type of media bed, the type and size of particulates sought to be filtered thereby and the optimum velocity flow of liquid through the system.

As the process liquid flows vertically upward through the filter bed 14, contaminant particles are retained by the filter bed through one of two different mechanisms. At the point where the process liquid flow first encounters the filter bed, surface filtration, the first mechanism, occurs. This mechanism occurs as the larger particulates are captured at the filter bed's lower surface, being unable to pass through the spaces between the particles, which make up the filter bed as the liquid flows up through the filter bed. As these larger particulates are captured at the lower surface of the filter bed, they form a crust on that surface.

Flowing along with the process liquid, smaller particulates may be captured at the bottom surface of the filter, retained by the crust formed by the accumulation of larger particulates. Thus, this crust may by itself prevent the passage of some of the smaller particulates. Some of the smaller particulates may also pass through the crust on the filter bed's lower surface, penetrate the bed, and become trapped by the second mechanism, depth filtration. In this mechanism, these smaller particulates are captured and retained in the interstitial spaces in the filter bed between the super-buoyant filter media particles. The smallest particles, depending on their size, the size of the bed particles, and the size of the openings in the bed support, may actually flow through the bed and exit the filter housing through the housing exit port 17 along with the out-flowing filtered process liquid.

After flowing through the filter bed support 16, the process liquid enters the top portion of the filter housing above the filter bed support structure and exits through the exit port 17. The liquid then flows through a connecting conduit 23 to a normally-open valve 24, another connecting conduit 26, and a flow sensor 27. Following the flow sensor 27, the liquid flows through an additional conduit 28 connecting to a clean process liquid reservoir 29 where the filtered liquid is stored. Also connected to this conduit 28 through an additional conduit 31, is normally-closed valve 32, and a final conduit 33 connected to a backwash reservoir 34. The backwash reservoir 34 provides a means of storing filtered process liquid for use in the backwash cycle that cleans the filter bed medium.

The backwash reservoir 34 is open with respect to the atmosphere through vent 38 to prevent pressure build-up during filling as well as to prevent creation of a vacuum when liquid is removed for backwashing the filter. A liquid level sensor 36 in the backwash reservoir 34 is attached to the filter controller 54 via wire 109. The filter controller 54 opens valve 32 via wire 110 whenever the backwash reservoir liquid level is low, thus allowing filtered process liquid exiting the filter housing 13 to enter and fill the backwash reservoir 34. When the backwash reservoir 34 is filled, the level sensor 36 indicates to the controller 54 via wire 109 that the reservoir is full, and the controller 54 turns off valve 32 via wire 110 to stop liquid flow into the backwash reservoir 34.

The flow sensor 27 measures the rate of flow of liquid exiting the filter bed. The signal from this sensor is transmitted to the filter controller 54 via wire 112. As the filter accumulates more and more particulates from the liquid stream, the resistance of the bed to liquid flow increases, and the flow of process liquid through the filter lessens (unless the flow of process liquid through the primary pump 7 is increased). At a critical point (defined by the filtration requirements for the process liquid), the flow measured by flow sensor 27 is low enough that the filter must be regenerated by a backwashing process to regain its filtration capacity. This point is identified by having the control system 54 monitor the output of flow sensor 27 via wire 112.

When a backwash operation is required, the normally-open valves 9, 24 in the filter inflow line and in the filter outflow line, respectively, are closed by the controller via wires 103 and 111, respectively, to prevent continued flow of the liquid through the filter. The normally-closed liquid drain valve 46 and the normally-closed atmospheric vent valve 22 are opened by the controller 54 via wires 102 and 108, respectively. With these valves open, "dirty" liquid drains from the filter housing into the collection reservoir 48 through conduit 11, valve 46 and conduit 47 by gravity flow under atmospheric pressure admitted into the housing through now open vent valve 22.

As the liquid drains into the collection reservoir 48, air enters the filter housing through valve 22 and conduit 21, and the liquid level in the housing drops. When the liquid level reaches the bottom of the filter bed, the super-buoyant bed media 14 (which is lighter than the process liquid, and is thus still pressed against the bed support 16 as it floats on top of the process liquid begins to descend in the filter housing 13 as it floats on the descending process liquid. Filter bed 14 is allowed to fall until the top surface of the filter bed has fallen below the midpoint of the filter housing 13, as indicated to the controller 54 by the lower fluid level sensor 18 via wire 106. At this point, the controller 54 closes drain valve 46 via wire 102 and the backwash spray process is initiated to clean the filter bed.

In the backwash spray process, clean liquid from the backwash reservoir 34 is withdrawn through conduit 37 by the backwash pump 39, which is turned on by the controller 54 via wire 104, and pumped through conduit 41, normally-closed valve 42 which is now open, and conduit 43, and then sprayed onto the top surface of the now lowered filter bed through single or multiple backwash spray nozzle(s) 44. The number of nozzles 44 is determined by the cross-sectional area of the filter bed and the identity and nature of the filter bed material. A single wide angle, solid cone nozzle with a wide angle of dispersion (e.g., >90 degrees) can easily backwash a filter housing of up to six to eight inches in diameter. Larger diameter housings require multiple spray nozzles for effective backwashing. When the filter bed consists of extremely fine particles, it can compress against the lower surface of the bed support 16 during filtration, thus forming a hard, compressed layer on the surface of the filter bed support. In such cases, it is usually necessary to have one or more additional spray nozzles that spray vertically upward to dislodge the compressed bed particles and wash them into the lower section of the filter housing 13.

The backwash spray delivered by nozzle(s) 44 washes adhering contaminant particulates off each filter particle of the filter bed 14. As this spray drains down through the remaining filter bed material, which is now in its lowermost position, carrying with it the collected contaminants, it accumulates in the bottom of the housing. As this drainage accumulates, the liquid level in the housing 13 rises, because of the continuing backwash process, and the super-buoyant media bed 14 (floating on top of the rising liquid) moves upward and past the backwash nozzle 44 which continues to spray clean liquid into the bed, thus continuously washing out the contaminant particulates, as illustrated in FIGS. 5A-5F. Because these contaminant particulates are heavier than either the liquid or the filter bed particles, the fluid spray washes them out of the bed and causes them to sink to the bottom of the filter housing 13. Simultaneously, the super-buoyant filter bed particles, which are lighter than the process liquid, continue to float upwards on the rising liquid level in the filter housing 13.

The backwash spray is continued until the entire filter bed 14 has risen above the nozzle 44, thus ensuring that all of the filter bed particles are cleansed by the spray of clean liquid emitted by the nozzle 44. Level sensor 19 indicates to the controller 54 via wire 107 that the level of liquid in the housing 13 has risen to the appropriate level, and thus indicates that the entire filter bed has been washed in this manner.

When the filter controller 54 receives information from the level sensor 19 that the liquid level is correct, the controller closes valve 42 via wire 105, opens drain valve 46 via wire 102, and thus causes the particulate-laden liquid to once more drain into the collection reservoir 48. This backwash sequence can then be repeated as necessary to ensure the highest level of cleanliness in the filter bed. Once backwashed, the clean filter medium, once again located in the lower end of the filter chamber, is again ready to filter particulates from the process liquid stream.

To accelerate the removal of contaminated liquid from the bottom of the filter housing, it is possible to add a suction pump or siphon tube (not shown) to the system. Such additions easily make it possible to remove the contaminated process liquid from the housing 13 in thirty seconds or less. After backwashing, the filtration process is again initiated by the controller 54 closing valves 46 and 22 via wires 102 and 108 opening the inlet valve 9 via wire 103 and the outlet valve 24 via wire 111, and pumping liquid from reservoir fluid pump 7 by actuating pump 7 via wire 101. As process liquid again enters the housing, the filter bed 14 again rises in the filter housing until it encounters the bed support 16. The filtration process then begins once again as the process liquid begins to flow upwards through the stabilized filter bed and the particulate contaminants begin to be captured by one of the two aforementioned filtration mechanisms.

Parallel Filter Housing Embodiment

Figure 7:
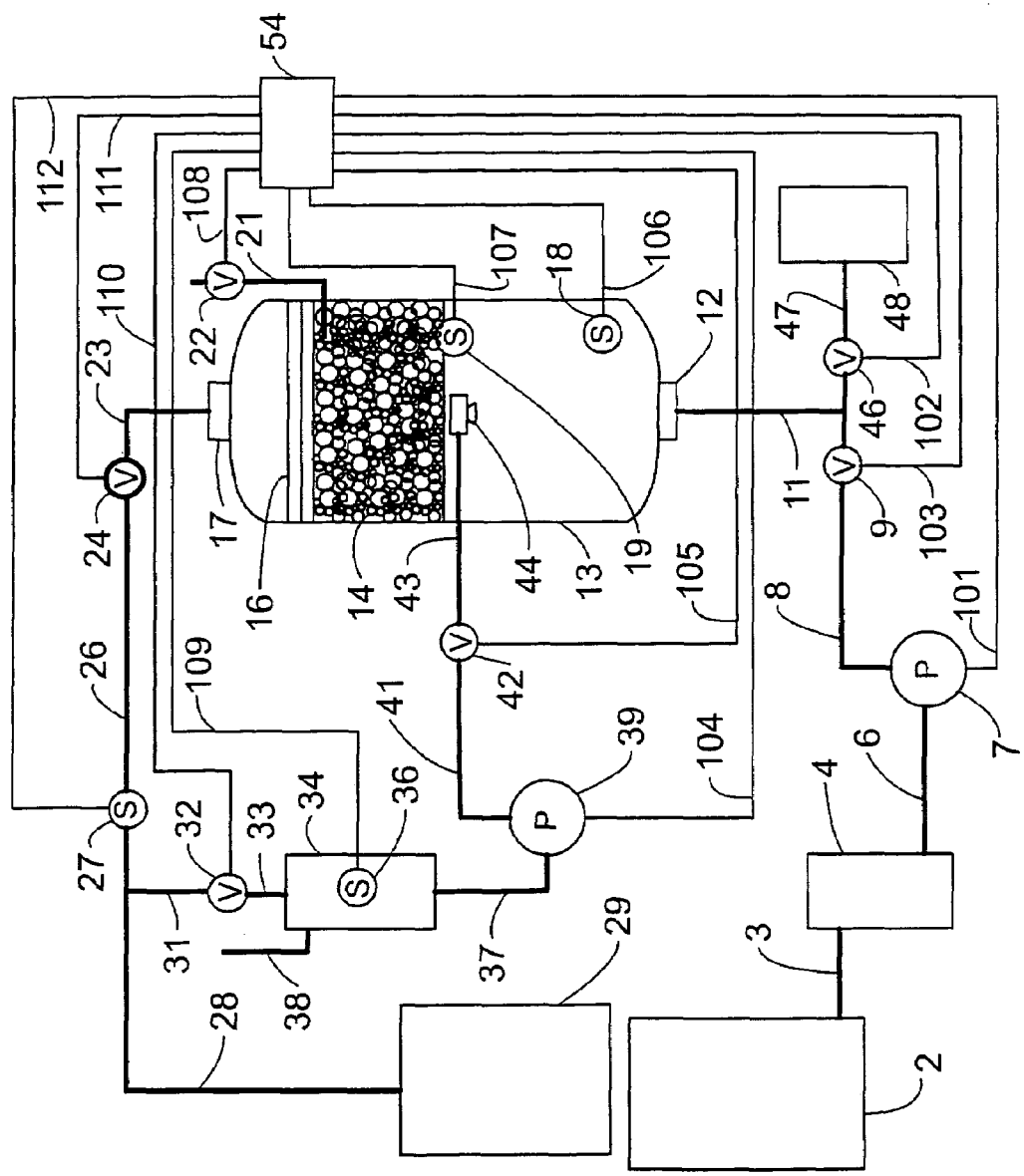
FIG. 7 is a diagrammatic view of the overall apparatus for filtering particulates from a process liquid according to the present invention.
Figure 8:
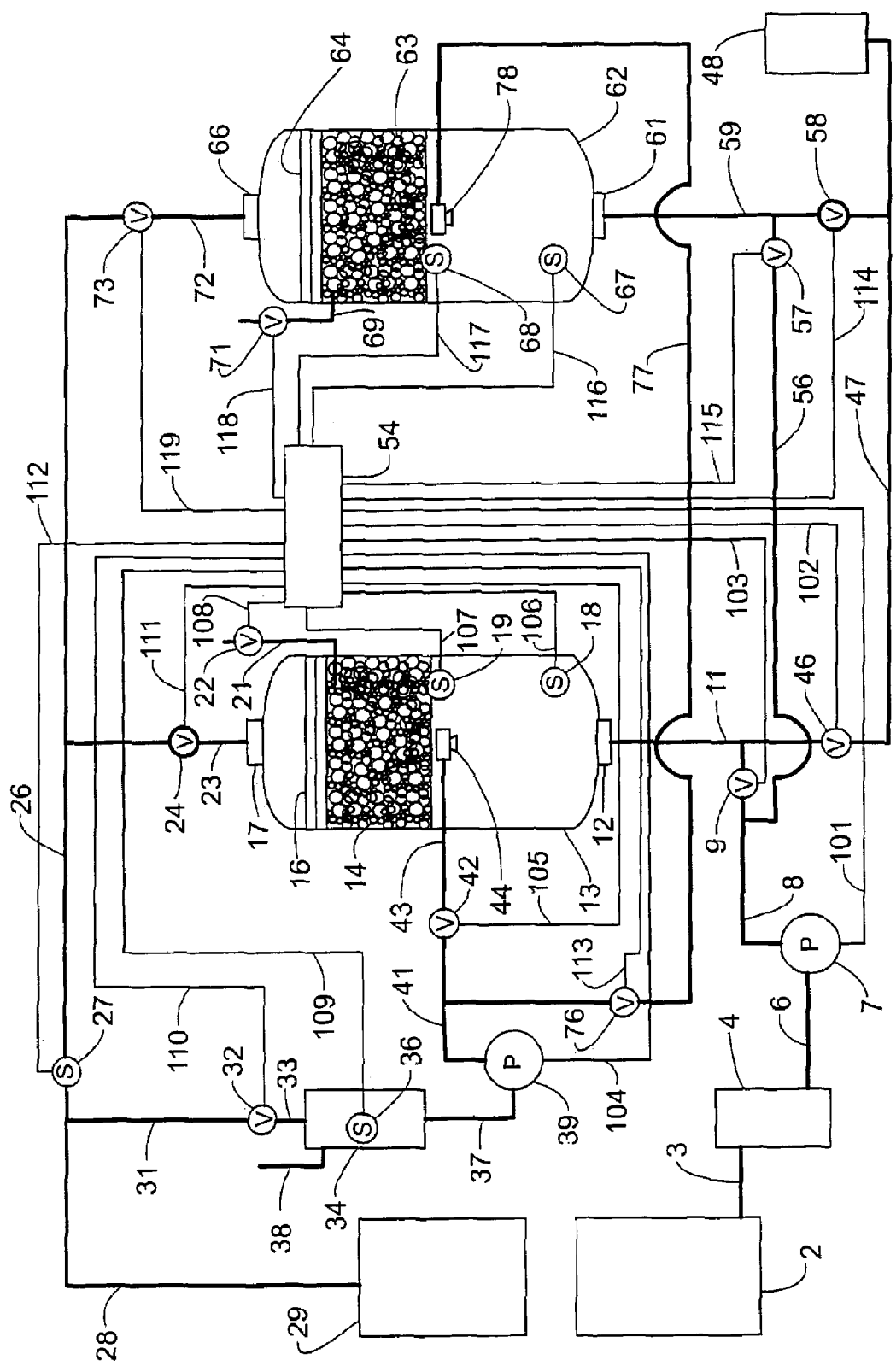
FIG. 8 is a diagrammatic view of the apparatus for filtering particulates from a process liquid utilizing dual filter housings connected in a parallel flow filtration system according to the present invention.

Depending on the specific filtration requirements of the process, modifications of the basic single housing filtration system illustrated in FIG. 7 and described above may be required for optimal filtration. In some processes, for example, it is undesirable or virtually impossible to temporarily discontinue operation of the filtration process to clean a filter by backwashing. Thus, in this second embodiment of this filtration system design, as illustrated in FIG. 8, two filter housings (containing the same type of bed material) are connected in parallel with one another, so that the filtration system can continue to function without interruption while one of the two filters is being cleaned by backwashing. In this embodiment, the two filters may be the same size or the primary filter may be larger than the secondary filter. In the former case, the two filters may share filtration effort equally, while in the latter case, the secondary filter serves only as a temporary filter to maintain filtration capability during the brief time required to backwash the primary filter.

In this embodiment, a central control system 54 with an embedded microprocessor is used to monitor the sensors installed in the filtration system, and to turn "ON" and "OFF" all of the actuators (pumps and valves) required to operate the system. Although this control system may also be operated manually, due to its increased complexity, the system is much more effectively controlled by an embedded microprocessor. As above, the embedded microprocessor enables more efficient operation of the system as well as providing unattended operating capability for operation during periods when no personnel are available to manually control the system.

In this second embodiment, the flow of the process liquid through the first or primary filter housing 13 follows the sequence described above for the system of FIG. 7. In the interest of brevity in this description, the operational sequence applicable to the embodiment of FIG. 7 is included herein by reference rather than repeating the sequence.

When backwash of the primary filter 13 is required in this second embodiment, the normally-open valves 9 and 24 in the primary filter inflow line 11 and in the filter outflow line 23, respectively, are closed by the controller 54 via wires 103 and 111, respectively, to prevent continued flow of the liquid through the filter 13. At the same time, the controller 54 opens normally-closed valves 57 and 73 via wires 115 and 119, respectively, to initiate the flow of process liquid through the secondary filter housing 62. The liquid is pumped by the primary pump 7 through conduits 8 and 56 to a now open (but normally-closed) valve 57 and into a connecting conduit 59 which attaches to the secondary filter housing 62 through the filter housing inlet 61.

After passing through the inlet 61 of the secondary filter housing 62, the flowing liquid spreads out and flows upward through the filter housing 62, causing the filter bed 63, which floats on top of the rising liquid, to rise in the housing 62. The secondary filter bed 63 is composed of the same particles as the primary filter bed 14. The particles in the secondary filter bed have the same specific size range, density and composition as the particles in the primary filter in order to meet the needs of the filtration process.

Alternatively, the primary filter 13 may be larger than the secondary filter 62. In the former case, the two filters may share filtration effort equally, while in the latter case, the secondary filter 62 serves only as a temporary filter to maintain filtration capability during the brief time required to backwash the primary filter 13.

As the process liquid flows into the secondary filter housing 62, the level of the process liquid rises in the housing, and the filter bed 63, floating on the rising process liquid, reaches the bed support 64 near the top of the filter housing 62. As described above in relation to the embodiment of FIG. 7, this support retains the super-buoyant filter bed media, and also provides a final filtration barrier to the particulates carried in the liquid. The filter bed support 64 is nominally formed from the same kind of multi-layer "sandwich" (FIGS. 2, 3) described above.

As the process liquid flows vertically upward through the filter bed 63, contaminant particles are retained by the filter bed 63 through surface filtration and depth filtration mechanisms. After flowing through the bed support 64, the rising liquid enters the top portion of the filter housing and exits through the exit port 66. The liquid then flows through a connecting conduit 72 to a normally-closed but now open valve 73, another connecting conduit 26, and the flow sensor 27. From the flow sensor, the liquid flows through an additional conduit 28 connected to the clean process liquid reservoir 29. Also connected to this conduit 28 through an additional conduit 31, normally closed valve 32, and final conduit 33, is the backwash reservoir 34. As the liquid level in the backwash reservoir 34 descends, it is measured by level sensor 36. When the level reaches a predetermined minimum value, the sensor signals the controller 54 through wire 109 to open valve 32 via wire 10. Additional clean liquid is then added to the backwash reservoir 34 through conduit 31, valve 32 and conduit 33. When the liquid level In the backwash reservoir 34 is returned to its normal level, the controller 54 closes valve 32 via wire 110 to stop the flow of liquid into the backwash reservoir 34.

Once the flow of the process liquid has been directed into the secondary filter housing for filtration, the backwash cycle for the primary filter housing 13 can be initiated. The normally-closed liquid drain valve 46 and the normally-closed atmospheric vent valve 22 are opened by the controller 54 via wires 102 and 108, respectively. With these valves open, dirty liquid drains from the primary filter housing 13 into the collection reservoir 48 through conduit 11, valve 46 and conduit 47.

As the liquid from the primary filter housing 13 drains into the collector reservoir 48 during the backwash cycle, air enters the filter housing through valve 22 and conduit 21, and the liquid level in the housing drops. When the liquid level reaches the bottom of the filter bed 14, the super-buoyant filter bed material (which is lighter than the process liquid, and thus is still pressed against the filter support 16 as it floats on top of the process liquid begins to descend in the filter housing 13 as it floats on the top of the receding liquid. The liquid level is allowed to descend until the top of the filter bed has descended below the midpoint of the filter housing 13. At this point, level sensor 18 signals the controller 54 via wire 106 that the liquid level has dropped to the appropriate level, and the controller closes the drain valve 46 via wire 102 and the backwash spray process is initiated to clean the primary filter bed as previously explained.

After backwashing of the primary filter bed 14 has been completed, the controller re-initiates the filtration process in the primary filter housing 13 by closing valves 46, 22 and 57, via wires 102, 108 and 115, respectively, and by opening the inlet valve 9 and exit valve 24 via wires 103 and 111, and pumping liquid from the reservoir 2 via the primary liquid pump 7. As process liquid again enters the housing 13, the filter bed 14 rises in the housing and stabilizes when it encounters the bed support structure 16. The filtration process then begins once again as the process liquid begins to flow upward through the stabilized filter bed.

Once the primary filter has been brought back into filtering operation, the secondary filter 63 contained in the secondary filter housing 62 can be cleaned in the same manner by the backwashing process used for the primary filter. In the case of the secondary filter, the process begins when the controller 54 opens the normally-closed liquid drain valve 58 and the normally-closed atmospheric vent valve 71 via wires 114 and 118. With these valves open, dirty liquid drains from filter housing 62 into the collection reservoir 48 through conduit 59, valve 58 and conduit 47.

As the liquid from the secondary filter housing 62 drains into the collection reservoir 48, air enters the filter housing 62 through valve 71 and conduit, 69, and the liquid level in the housing 62 drops. When the liquid level reaches the bottom of the filter bed 63, the bed material (which is lighter than the process liquid, and thus still pressed against the bed support 64 as it floats on top of the process liquid) begins to descend in the filter housing 62 as it floats on the top of the receding liquid. The liquid level is allowed to descend until the top of the filter bed has fallen below the midpoint of the filter housing 62, as indicated to the controller 54 by the lower liquid level sensor 67 via wire 116. At this point, the controller closes drain valve 58 via wire 114 and the backwash spray process is initiated to clean the secondary filter bed.

To effectively backwash the secondary filter 63, clean liquid from the backwash reservoir 34 is again withdrawn through conduit 37 by the backwash pump 39 and pumped through the supply conduit 41, the normally-closed valve 76 which the controller has opened via wire 113, and conduit 77, and is then sprayed onto the filter bed 63 through single or multiple backwash spray nozzle(s) 78. As explained with respect to the FIG. 7 embodiment, the number of nozzles 78 is determined by the cross-sectional area of the filter bed and the identity and nature of the filter bed material. The same backwashing procedure as explained with respect to the FIG. 7 embodiment continues until the entire filter bed has risen above the nozzle 78, allowing all of the bed particles to be cleansed by the spray of clean liquid emitted by the nozzle 78. Level sensor 68 then indicates to the controller via wire 117 when the level of liquid in the housing 62 has risen to the appropriate point, thus indicating that the entire secondary filter bed has been washed of all contaminants and particulate matter. When the controller 54 receives information from level sensor 68 via wire 117 that the liquid level is appropriate, the controller 54 opens the drain valve 58 via wire 114, and the particulate-laden liquid once more drains into the collection reservoir 48. This backwash sequence can then be repeated if necessary to ensure the highest level of cleanliness in the filter bed. The backwashed, clean filter medium 63 is then once again ready to filter particulates from the process liquid stream. To accelerate the removal of contaminated liquid from the bottom of the filter housing, it is possible to add a suction pump or siphon tube (neither shown) to the system. Such additions make it possible to remove the contaminated process liquid from the housing 62 in less than one minute.

Series Filter Housing Embodiment

Figure 9:
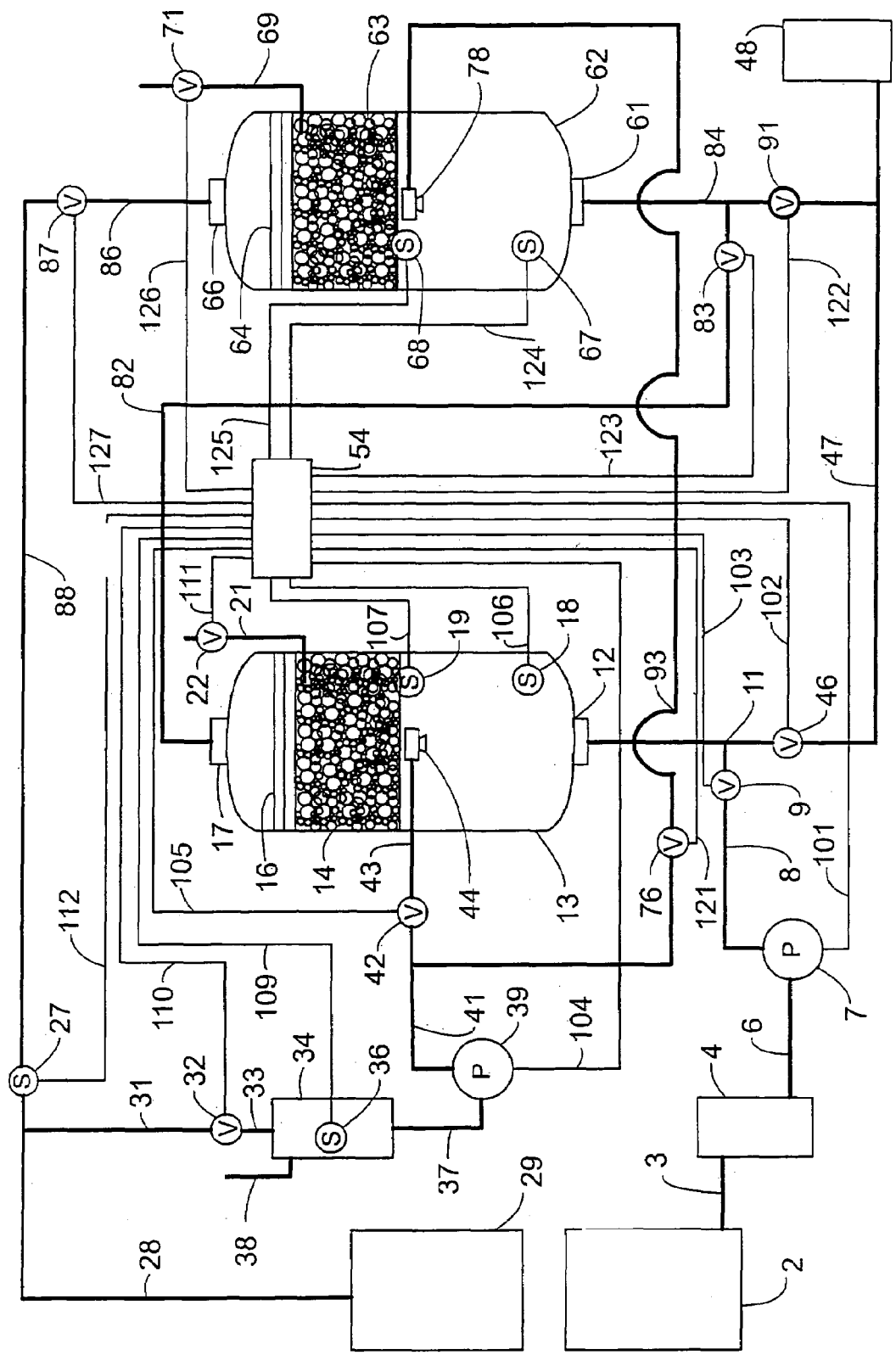
FIG. 9 is a diagrammatic view of the apparatus for filtering particulates from a process liquid utilizing dual filter housings connected in a serial flow filtration system according to the present invention.

In this embodiment, two filter housings are connected in series with one another as illustrated in FIG. 9 to provide a filtration capability which is enhanced over that provided by a single filter. In this embodiment, the super-buoyant filter bed material 14 in the first housing 13 is selected to filter out one or more specific components while the super-buoyant bed material 63 in the second housing 62 is selected to filter out one or more components different from those removed by the first filter. For example, in one specific embodiment, the bed material 14 in the first housing 13 is composed of coarser, larger diameter particles, while the filter bed material 63 in the second housing 62 is composed of finer, smaller diameter particles. This embodiment allows the first filter bed 14 to serve as a "coarse" filter for removing larger contaminant particles, and the second filter bed 63 to serve as a "fine" filter for removing smaller contaminant, particles which remain after the process liquid passes through the first bed 14. By arranging these two filters in series as shown, it is possible to optimize each filter bed for the removal of specific contaminants and thus to maximize the total amount of contaminant removed by the filtration system.

In operation, the process liquid to be filtered is withdrawn from the storage reservoir 2 through conduit 3 to the priming chamber 4, by the vacuum created by the pumping action of the primary pump 7. Alternatively, the liquid may also be withdrawn directly from a process liquid stream. The liquid then passes from priming chamber 4 through conduit 6 to the primary liquid pump 7, by which it is pumped through conduit 8, to the normally-open inlet valve 9, and into the connecting conduit 11. Through the connecting conduit 11 in turn, the liquid is pumped into the first filter housing 13 through the filter housing inlet 12 as previously described in relation to the FIG. 7 embodiment.

In embodiment of FIG. 9, as in the previous embodiments, after passing through the inlet 12, the flowing liquid spreads out and flows upward through the filter housing 13, causing the filter bed 14, which floats on top of the rising liquid to rise in the housing 13. The first filter bed 14 is composed of super-buoyant particles having a specific gravity less than one half that of the liquid being filtered, and selected to be within a specific size range, e.g., between 0.5 and 1.0 mm for a "coarse" filter. As with the other embodiments, the size and composition of the filter bed particles, as well as the bed volume and filtration area, are determined by the specific process liquid filtration requirements, including the size and nature of the particulates to be removed from the process liquid. The particles which compose the filter bed 14 are typically formed from plastic, glass or ceramic materials, but in any event these particles must have a specific gravity less than one half that of the specific gravity of the liquid being filtered.

As previously described with respect to the other embodiments, the level of the process liquid rises in the housing 13, the filter bed 14, which is floating on the rising process liquid, rises until it touches the bed support 16 adjacent the top of the filter housing. This support 16 retains the bed media 14, and prevents it both from rising any further and from flowing out of the filter housing along with the liquid being filtered. The bed support 16 also provides a final filtration barrier to the particulates carried in the liquid. As described above, the bed support 16 is nominally formed from a multi-layer sandwich (FIG. 2), consisting of a perforated metal plate 16a, and two or more layers of screen 16b and 16c or alternatively (FIG. 3), a layer of screen 16b and a layer of semi-permeable membrane or sintered permeable plastic or metal material 16d.

Selection of these constituent layers depends upon the size of the filter bed particles. The fine mesh screen 16c or membrane layer 16d is positioned adjacent the lower face of the bed support 16 immediately next to the filter bed media, a medium mesh screen 16b is positioned in the center to provide structural support for the fine layer, and the perforated metal plate 16a is last and provides structural stiffening. The fine material, whether screen 16c or permeable membrane 16d, is always the layer which directly contacts the top of the filter bed media 14. The other layers serve to provide structural support and enhance liquid flow through the bed support 16. This multiple layer design provides the strength necessary to retain the bed media under working filtration pressures that may be as high as 75-150 psi, as previously described. As the process liquid flows vertically upward through the filter bed 14, contaminant particles are retained by the filter bed through two different mechanisms previously discussed. At the point where the process liquid flow first encounters the super-buoyant media filter bed, surface filtration, the first mechanism, occurs. This mechanism occurs as the larger particulates are captured at the filter bed's lower surface, being unable to pass through the spaces between the particles that make up the filter bed as the liquid flows up through the bed. As these larger particulates are captured at the lower surface of the filter bed, they form a crust on that surface.

Flowing along with the process liquid, smaller particulates may be captured at the bottom surface of the filter, retained by the crust formed by the accumulation of larger particulates. Thus, this crust may by itself prevent the passage of some of the smaller particulates. Alternatively, the smaller particulates may pass through the crust on the filter bed's lower surface, penetrate the bed, and become trapped by the second mechanism, namely, depth filtration, which captures and retains the smaller particles in the interstitial spaces between the filter media particles forming the bed. The smallest particulates will pass through the crust on the first filter bed's lower surface, the bed 14 itself and the bed restraint structure 16. These particulates will then flow with the liquid out of the filter through the filter housing outlet 17, conduit 82, the normally-open inlet valve 83 for the second filter bed, conduit 84, and finally into the second filter housing 62 through the housing inlet 61.

After passing through the inlet 61, the flowing liquid spreads out, and flows vertically upward through the filter housing 62, causing the filter bed 63, which floats on top of the rising fluid, to rise in the housing 62. The second filter bed 63 is composed of smaller diameter particles than the first filter bed 14 (e.g., 0.05 to 0.1 mm). The second filter bed particles are selected to be within the specific size range and composition to meet the specific needs of the filtration process as well as having a specific gravity lower than that of the liquid being filtered.

As the process liquid flows into the filter housing 62, the level of the process liquid rises in the housing, and the bed 63, floating on the rising process liquid, reaches the bed support 64 adjacent the top of the filter housing. As described above, this support retains the bed media 63, and also provides a final filtration barrier to the particulates carried in the liquid. The bed support is nominally formed from the same kind of multi-layer sandwich 16 previously discussed and illustrated in FIGS. 2 and 3.

As the process liquid flows vertically upward through the filter bed 63, the smallest contaminant particles are retained by the second filter bed 63 through both surface filtration and depth filtration mechanisms. After flowing through the bed support 64, the liquid enters the top of the filter housing and exits through the exit port 66. The liquid then flows through a connecting conduit 86 to a normally-open valve 87, another connecting conduit 88, and a flow sensor 27. From the flow sensor 27, the liquid flows through an additional conduit 28 that connects to a clean process liquid reservoir 29. Also connected to this conduit 28 through an additional conduit 31, normally-closed valve 32, and final conduit 33, is the backwash reservoir 34. As the liquid level in the backwash reservoir 34 recedes and is sensed by level sensor 36, the sensor signals the controller 54 via wire 109 and the controller adds clean liquid to the reservoir 34 by opening normally-closed valve 32 via wire 110. When the liquid level in the backwash reservoir 34 is sufficient, the level sensor 36 signals the controller 54 via wire 109 and the controller closes valve 32 via wire 110 to stop the flow of liquid into the reservoir 34.

The backwash process in this embodiment is to clean each bed individually, routing the dirty liquid from both filters into the collection tank 48. When backwash operation is required in this embodiment, the controller 54 closes the normally-open valves 9, 83 in the first filter inflow line 11, in the second filter inflow line 82, and valve 87, in the filter outflow line 86 via wires 103, 123 and 127, respectively, to prevent continued flow of the liquid through the filters. The controller 54 opens the normally-closed liquid drain valve 46 and the normally-closed atmosphere vent valves 22 via wires 102 and 111. With these valves 46, 22 open, dirty liquid drains from the first filter housing 13 into the collection reservoir 48 through conduit 11, valve 46 and conduit 47. As the liquid from the first filter housing 13 drains into the collection reservoir 48, air enters the filter housing through valve 22 and conduit 21, and the liquid level in the housing drops. When the liquid level reaches the bottom of the bed, the bed material 14 (which has a specific gravity less than one half that of the process fluid, and thus is still pressed against the retaining screen 16 as it floats on top of the process liquid) begins to descend in the filter housing 13 as it floats on the top of the receding liquid. The liquid level is allowed to recede until the top of the filter bed has descended below the midpoint of the filter housing, which fact is indicated to the controller 54 by the lower liquid level sensor 18 via wire 106. At this point, the controller 54 closes the drain valve 46 via wire 102 and the backwash process is initiated to clean the filter bed 14.

In the backwash process for this embodiment of the invention, clean liquid from the backwash reservoir 34 is withdrawn through conduit 37 by the backwash pump 39 and pumped through the supply conduit 41, the normally-closed valve 42 which the controller 54 has now opened via wire 105, and conduit 43 and then sprayed onto the bed through single or multiple backwash spray nozzle(s) 44. The number of nozzles 44 is determined by the cross-sectional area of the filter bed and the identity of the bed material. A single wide angle solid cone nozzle with a wide angle of dispersion (e.g. 90 degrees) can easily backwash a filter bed contained in a housing of up to six to eight inches in diameter. Larger diameter housings and smaller particle filter beds require multiple liquid spray nozzles for effective backwashing. When the bed consists of extremely small particles, which may compress during filtration, it may be necessary to have one or more additional spray nozzles spray vertically upwardly to help dislodge the compressed bed particles and wash them into the lower section of the filter housing 13.

As clean liquid is sprayed downward from the nozzle 44, it washes adhering contaminant particulates off each particle of the filter bed 14. As this sprayed liquid drains down through the remaining bed material, carrying with it the collected contaminants and any additional contaminants that become entrained in the liquid along the way, it accumulates in the bottom of the housing. As it accumulates, the liquid level in the housing rises, and the super-buoyant media bed (floating on top of the liquid) rises in the housing. As the bed 14 rises, the bed particles move upward in the housing, moving the bed particles past the backwash nozzle 44, which is now essentially embedded in the filter bed 14, and which continues to spray clean liquid into the bed, thus continuously washing out of the filter bed the contaminant particulates.

Because these contaminant particulates are heavier than either the liquid or the bed particles, the liquid spray washes them out of the bed and causes them to sink to the bottom of the filter housing. Simultaneously, the filter bed particles, which are lighter than the process liquid, continue to float upwards on the rising liquid level in the filter housing. The backwash spray is continued until the entire bed has risen above the nozzle, allowing all of the bed particles to be cleansed by the spray of clean liquid emitted by the nozzle 44. Level sensor 19 indicates to the controller 54 through wire 107 that the level of liquid in the housing 13 has risen to the highest appropriate level, thus indicating that the entire bed has been washed in this fashion and that the filter bed now is positioned in the top portion of the filter housing above the body of contaminated liquid.

When the filter controller receives the signal from level sensor 19 that the level is appropriate, the controller 54 opens drain valve 46 via wire 102, and the particulate-laden contaminated liquid drains into the collection reservoir 48. Such draining may be effected by gravity induced flow, or a suction pump or siphon tube may be utilized to totally drain the contaminated liquid in less than one minute, causing the filter bed to descend in the housing as the contaminated liquid recedes.

This backwash sequence can then be repeated as necessary to ensure the highest level of cleanliness in the filter bed. After the backwash process is completed, the controller 54 closes normally-closed valves 22 and 46 via wires 111 and 102. Once backwashed, the clean filter medium is then again ready to filter particulates from the process liquid stream.

After the first filter bed 14 is backwashed, the second filter bed 63 backwash operation is performed. To backwash the second filter bed 63, the controller 54 keeps the normally-open valves in the filter inflow line 83 and in the filter outflow line 87 closed to prevent continued flow of the liquid through the filter. The controller 54 then opens the normally-closed liquid drain valve 91 and the normally-closed atmospheric vent valve 71 via wires 122 and 126. With these valves open, dirty liquid drains from filter housing 62 into the collection reservoir 48 through conduit 84, valve 91 and conduit 47. As the liquid from the secondary filter housing 62 drains into the collection reservoir 48, air enters the filter housing through valve 71 and conduit 69, and the liquid level in the housing drops.

When the liquid level reaches the bottom of the bed, the bed material begins to descend in the filter housing 62 as it floats on the top of the receding liquid. The liquid level is allowed to fall until the top of the filter bed has descended below the midpoint of the filter housing, as indicated to the controller 54 by the lower liquid level sensor 67 via wire 124. At this point, the controller closes drain valve 91 via wire 122 and the backwash process is initiated to clean the filter bed.

In the backwash process, clean liquid from the backwash reservoir 34 is withdrawn through conduit 37 by the backwash pump 39 and pumped through the supply conduit 41, the normally-closed valve 76 which the controller has now opened via wire 121, and conduit 93 and then sprayed onto the bed through single or multiple backwash spray nozzle(s) 78. The number of nozzles 78 is determined by the cross-sectional area of the filter bed and the identity of the bed material. When the bed consists of extremely small particles, which may compress during filtration, it may be necessary to have one or more additional spray nozzles spray vertically upward to help dislodge the compressed bed particles and wash them into the lower section of the filter housing 62.

As clean liquid is sprayed downward from the nozzle 78, it washes adhering contaminant particulates off each particle of the filter bed 63. As this sprayed liquid drains down through the remaining bed material, carrying with it the collected contaminants, it accumulates in the bottom of the housing. As it accumulates, the liquid level in the housing rises, and the super-buoyant media bed (floating on top of the liquid) rises in the housing. As the bed rises, the bed particles move upward in the housing, moving the bed particles past the backwash nozzle 78 which continues to spray clean liquid into the bed, thus continuously washing out the contaminant particulates and causing them to sink to the bottom of the filter housing 62. Simultaneously, the filter bed particles, which are lighter than the process liquid, continue to float upward on the rising liquid level in the filter housing.

The backwash spray is continued until the entire bed has risen above the nozzle, allowing all of the bed particles to be cleansed by the spray of clean liquid emitted by the nozzle 78. Level sensor 68 indicates to the controller 54 through wire 125 that the level of liquid in the housing 62 has risen to the appropriate level, thus indicating that the entire bed has been washed in this fashion and now lies above the contaminated body of liquid. When the filter controller 54 receives information from the level sensor 68 that the level of the contaminated liquid is appropriate, it opens drain valve 91 via wire 122, and all the particulate-laden liquid once more drains into the collection reservoir 48. This backwash sequence can then be repeated as necessary to ensure the highest level of cleanliness in the filter bed. The backwashed, clean filter medium is then again ready to filter particulates from the process liquid stream.

After backwashing of both filter beds 14 and 63 is completed, the filtration process is again initiated when the controller 54 closes valves 91 and 71 via wires 122 and 126, opens the inlet valves 9 and 83 and exit valve 87 via wires 103, 123 and 127, respectively, and pumps liquid from the reservoir 2 via the primary fluid pump 7. As process liquid again enters the housings, the filter beds 14, 63 rise in the housings and stabilize when they encounter their respective filter bed restraint structures 16, 64. The filtration process then begins once again as the process liquid begins to flow upward through the stabilized filter beds.

Filtration of Dissolved Metals

Figure 10:
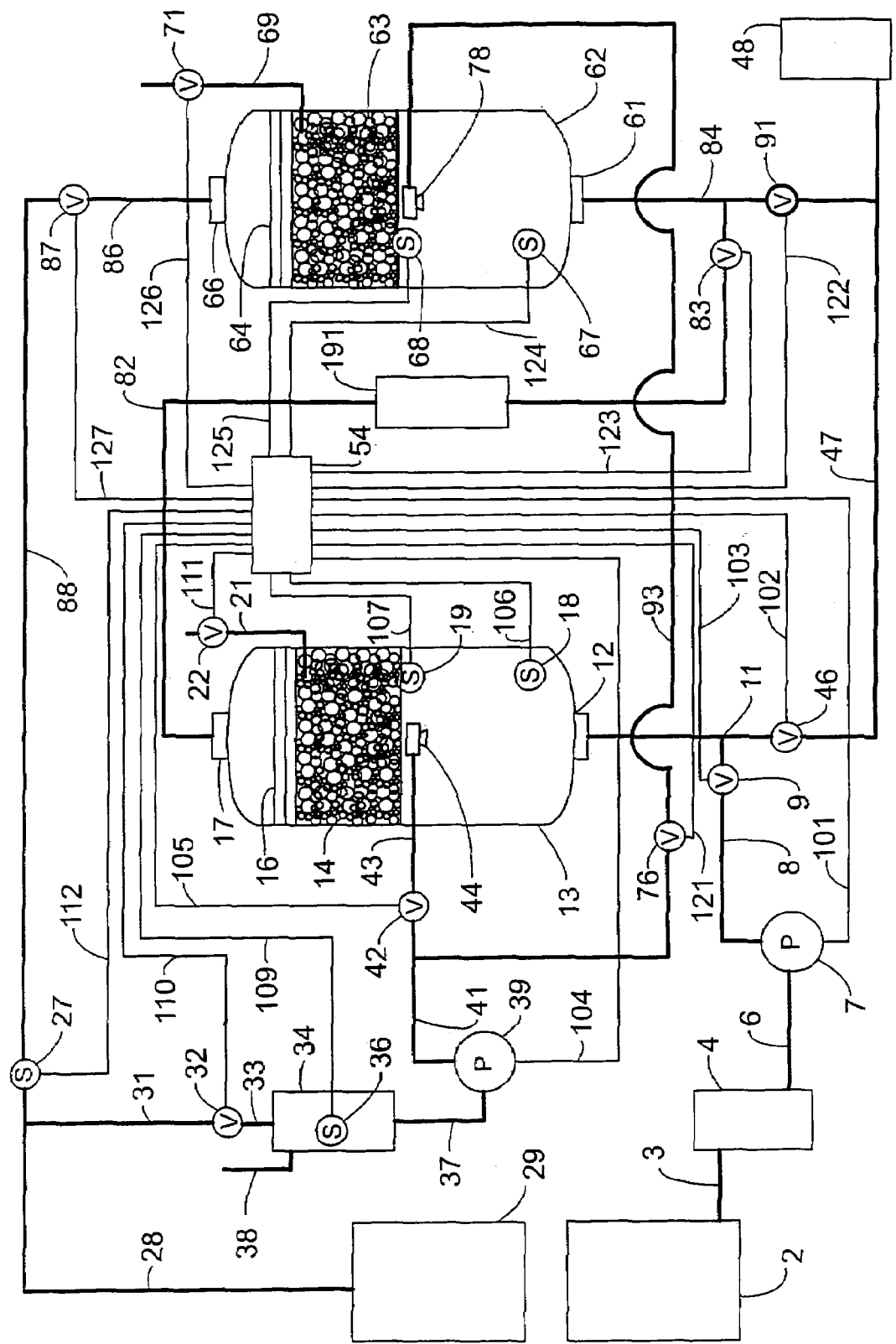
FIG. 10 is a diagrammatic view of the filtration apparatus incorporating an intermediate hydroxyl ion-generating reactor which functions to precipitate dissolved metal ions prior to flowing through the filter bed to enable filtering precipitates thereof from a process liquid utilizing the dual filter, serial flow filtration system illustrated in FIG. 9.

In this embodiment, illustrated diagrammatically in FIG. 10, two filter housings 13 and 62 are arranged in series as described above with respect to FIG. 9, and function by a unique method of chemical precipitation of dissolved, ionized metals in the aqueous solutions, followed by filtering of and removal of the precipitated particulates from the process liquid with a particulate filter as previously discussed. This is in contrast to dissolved metals conventionally precipitated in a liquid containing them by the direct addition of basic solutions (e.g., lime, sodium hydroxide, potassium hydroxide), which provide the required hydroxyl ions for initiation of the precipitation reaction. This addition of basic solutions is usually accomplished conventionally by using a metering pump to inject precise amounts of the basic solution into the process liquid stream as it enters a reactor, which serves to ensure sufficient mixing for the metal hydroxides to form and precipitate. These precipitates are subsequently captured by a particulate filtration system.

The advantage of the metals removal system described herein, in contrast to the conventional method described above, is that no basic solutions need be added to cause the precipitation. Instead, the hydroxyl ions are generated directly in the process liquid by pumping the liquid through an ultraviolet radiation reactor. This ultraviolet radiation forms hydroxyl ions in the metal-containing aqueous solution. These hydroxyl ions chemically combine with the ionized metals and cause them to precipitate and form particulates. These particulates are then removed from the aqueous solution by the filter bed filtration embodiments described herein.

A diagram of a system to effect this type of precipitation is presented in FIG. 10. The diagram presented in this figure illustrates a pair of filter beds connected in series as described above and illustrated in FIG. 9. In FIG. 10, however, an ultraviolet reactor 191 has been added to the system to process aqueous solution exiting from the first (coarse) filter housing 13. Except for the addition of the ultraviolet reactor 191, the structure and operation of the system of FIG. 10 is in all respects similar to the structure and operation of the system illustrated in FIG. 9 and described hereinabove. Accordingly, in the interest of brevity in this description, the operation of the system of FIG. 10 will not be described in detail and the description of the system illustrated in FIG. 9 is incorporated herein by reference. In this embodiment, suffice to say that both the smallest particulate and the dissolved metals will flow with the liquid out of the filter housing 13 through the filter housing outlet 17 and will proceed through conduit 82.

The aqueous process liquid then flows through an ultraviolet (UV) exposure reactor 191, where it is exposed to a high flux of UV radiation. The UV radiation induces the formation of hydroxyl ions in the liquid, which subsequently combine with the ionized metals in the solution to form insoluble precipitate particles. The liquid then flows out of the UV exposure reactor 191, through the normally-open inlet valve 83 for the second filter bed, conduit 84, and into the second filter housing 62 through the housing inlet 61. The process liquid, now bearing the insoluble precipitated particles passes upward through the filter bed 63 in the second filter housing 62 as previously described.

While the invention has been described as having specific embodiments, it will be understood that it is capable of further modification. The disclosure herein is therefore intended to cover any variations, uses, or adaptations of the Invention as come within the scope of the appended claims. Accordingly, having described the invention, what is believed to be new and novel and sought to be protected by letters patent is as follows.

I claim:

1. The method of filtering contaminated particulates from a process liquid having a predetermined specific gravity to enable re-use of the filtered and de-contaminated process liquid, comprising:
    a) drawing particulate contaminated process liquid from a source thereof;
    b) applying pressure of from approximately 20 to 150 psi to the particulate contaminated process liquid drawn from said source;
    c) delivering an initial quantity of said pressurized particulate contaminated process liquid into a filter chamber having an inlet port, an outlet port and a composite filter bed formed by distinct super-buoyant filter particles having a specific gravity lower than one half that of the said predetermined specific gravity of said process liquid and have a particle size of 0.1 microns to 1.0 mm, whereby said filter bed has the capacity to float on top of said process liquid, wherein said super-buoyant particles are restrained by a bed support adapted to resist the process fluid pressure required to move said process liquid through said filter bed at said pressure;
    d) continuing the delivery of said pressurized particulate contaminated process liquid into the inlet port of said filter chamber to effect displacement of a composite mass of distinct filter particles comprising said filter bed from adjacent said inlet port to adjacent said outlet port where displacement of said filter bed is terminated;
    e) continuing the delivery of said pressurized particulate contaminated process liquid into said filter chamber after displacement of said filter bed has terminated, whereby continued delivery of said pressurized process liquid into said filter chamber results in said process liquid being forced to flow through the now stationary composite mass of distinct super-buoyant filter particles whereby said particulates are captured and retained by said composite mass of distinct filter particles;
    f) discharging filtered and de-contaminated process liquid from said filter chamber through said outlet port and delivery to at least one storage reservoir; and
    g) backwashing said filter bed to remove contaminants from said super-buoyant particles.

2. The method according to claim 1, wherein said filtered and de-contaminated process fluid is selectively delivered to one of two storage reservoirs having inlet and outlet ports.

3. The method according to claim 1, wherein a pump is provided having an inlet port connected to said source of particulate contaminated process liquid and an outlet port connected to the inlet port of said filter chamber.

4. The method according to claim 1, wherein particulates larger in size than the interstices of said super-buoyant filter bed are filtered from said process liquid by the mechanism of surface filtration wherein said larger particulates adhere to the upstream surface of said filter bed and form a crust thereon through which smaller particulates penetrate.

5. The method according to claim 1, wherein particulates smaller in size than the interstices of said filter bed are filtered from said process liquid by the mechanism of depth filtration wherein said smaller particulates are captured and retained in the interstitial spaces in the filter bed between the distinct filter bed particles.

6. The method according to claim 1, wherein at least a portion of said filtered and de-contaminated process liquid discharged from said filter chamber is selectively directed into a backwash reservoir for storage and selective re-use in backwashing said filter bed to remove accumulated particulates therefrom.

7. The method according to claim 1, wherein the flow rate of process fluid exiting the filter chamber is sensed, measured and compared over time with the flow rate of process liquid exiting the filter chamber at the commencement of a filtering cycle to determine the resistance to the flow of process liquid through said super-buoyant filter bed and upon reaching a predetermined resistance level correlated to a specific low rate of flow of said process liquid a backwash cycle is initiated to remove particulates adhering to said filter bed.

8. The method according to claim 7, wherein when said predetermined resistance level is reached, delivery of said particulate contaminated process liquid to and from said filter chamber is temporarily discontinued, the particulate-laden process liquid in said filter chamber is drained into a reservoir whereupon said composite filter bed is displaced to adjacent said inlet port of the filter chamber following which clean non-contaminated process liquid is sprayed onto an entire bed of the composite super-buoyant filter bed to backwash therefrom particulate contaminants previously filtered from said process liquid, then draining the filter chamber of particulate contaminated backwash process liquid, and thereafter re-initiating delivery of particulate contaminated process liquid to said filter chamber to commence another filtering cycle.

9. The method according to claim 8, wherein backwashing of said filter bed is initiated automatically when said super-buoyant filter bed has been displaced to a predetermined level within said filter chamber adjacent said inlet port whereupon spraying of clean non-contaminated process liquid onto said filter bed is initiated.

10. The method of claim 1, wherein said backwashing step comprises delivering a clean process liquid to said filter bed using at least one nozzle positioned beneath said bed support.

11. The method of claim 10, wherein said backwashing step further comprises delivering said clean process liquid into said filter chamber such that said filter bed rises above said at least one nozzle.

12. The method of claim 1, wherein said bed support is a multi-layered support comprising a perforated metal plate and two or more layers of screen.

13. A method of filtering contaminated particulates from a process liquid having a predetermined specific gravity to enable re-use of the filtered and de-contaminated process liquid, comprising:

a) drawing particulate contaminated process liquid from a source thereof;

b) applying pressure to the particulate contaminated process liquid drawn from said source;

c) delivering an initial quantity of said pressurized particulate contaminated process liquid into a filter chamber having an inlet port, an outlet port and a composite filter bed formed by distinct super-buoyant filter particles having a specific gravity lower than one half that of the said predetermined specific gravity of said process liquid whereby said filter bed has the capacity to float on top of said process liquid;

d) continuing the delivery of said pressurized particulate contaminated process liquid into the inlet port of said filter chamber to effect displacement of a composite mass of distinct filter particles comprising said filter bed from adjacent said inlet port to adjacent said outlet port where displacement of said filter bed is terminated;

e) continuing the delivery of said pressurized particulate contaminated process liquid into said filter chamber after displacement of said filter bed has terminated, whereby continued delivery of said pressurized process liquid into said filter chamber results in said process liquid being forced to flow through the now stationary composite mass of distinct super-buoyant filter particles whereby said particulates are captured and retained by said composite mass of distinct filter particles;

f) discharging filtered and de-contaminated process liquid from said filter chamber through said outlet port and delivery to at least one storage reservoir;

g) sensing, measuring and comparing over time the flow rate of process fluid exiting the filter chamber with the flow rate of process liquid exiting the filter chamber at the commencement of a filtering cycle to determine the resistance to the flow of process liquid through said super-buoyant filter bed;

h) initiating a backwash cycle to remove particulates in the filter bed upon reaching a predetermined resistance level correlated to a specific low rate of flow of said process liquid, said backwash cycle includes spraying non-contaminated process liquid onto an entire bed of the composite super-buoyant filter bed to backwash therefrom particulate contaminants previously filtered from said process liquid.

14. The method of claim 13, wherein said step of initiating a backwash cycle includes temporarily discontinuing delivery of said particulate contaminated process liquid to and from said filter chamber and draining the particulate-laden process liquid in said filter chamber into a reservoir.

15. The method of claim 14, wherein said step of initiating a backwash cycle further includes displacing said composite filter bed to adjacent said inlet port of the filter chamber prior to spraying non-contaminated process liquid onto the composite super-buoyant filter bed.

16. The method of claim 15, wherein said step of initiating a backwash cycle further includes draining the filter chamber of particulate contaminated backwash process liquid after spraying non-contaminated process liquid onto the composite super-buoyant filter bed, and thereafter re-initiating delivery of particulate contaminated process liquid to said filter chamber to commence another filtering cycle.

17. The method of claim 16, wherein backwashing of said filter bed is initiated automatically when said super-buoyant filter bed has been displaced to a predetermined level within said filter chamber adjacent said inlet port whereupon spraying of clean non-contaminated process liquid onto said filter bed is initiated.

18. The method of claim 13, wherein said backwash cycle includes rigorous spraying of non-contaminated process liquid onto the composite super-buoyant filter bed to backwash therefore particulate contaminants previously filtered from said process liquid.

19. The method of claim 13, wherein said backwash cycle includes spraying with a wide angle, solid cone nozzle.

20. The method of claim 13, wherein said step of spraying non-contaminated process liquid onto the composite super-buoyant filter bed begins when said composite super-buoyant filter bed is beneath a spray nozzle and continuous until the entire composite super-buoyant filter bed has risen above the spray nozzle.

21. The method of claim 13, wherein said super-buoyant filter particles are selected to be a specific size within the range of 0.1 micron and 25.4 mm.

22. The method of claim 13, wherein said super-buoyant filter particles are selected to be a specific size within the range of 0.1 micron and 1.0 mm.

* * * * *